US012249135B2

(12) United States Patent
Kuroda

(10) Patent No.: US 12,249,135 B2
(45) Date of Patent: Mar. 11, 2025

(54) INFORMATION PROCESSING APPARATUS, INFORMATION PROCESSING METHOD, AND PROGRAM

(71) Applicant: SONY GROUP CORPORATION, Tokyo (JP)

(72) Inventor: Shin Kuroda, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 229 days.

(21) Appl. No.: 17/773,753

(22) PCT Filed: Nov. 16, 2020

(86) PCT No.: PCT/JP2020/042585
§ 371 (c)(1),
(2) Date: May 2, 2022

(87) PCT Pub. No.: WO2021/106648
PCT Pub. Date: Jun. 3, 2021

(65) Prior Publication Data

US 2022/0383632 A1 Dec. 1, 2022

(30) Foreign Application Priority Data

Nov. 27, 2019 (JP) ................................ 2019-214424

(51) Int. Cl.
*G06K 9/00* (2022.01)
*G06V 10/54* (2022.01)
*G06V 10/98* (2022.01)

(52) U.S. Cl.
CPC .............. *G06V 10/98* (2022.01); *G06V 10/54* (2022.01)

(58) Field of Classification Search
CPC ............................... G06V 10/98; G06V 10/54
See application file for complete search history.

(56) References Cited

U.S. PATENT DOCUMENTS

2013/0271674 A1* 10/2013 Liu ........................ G02F 1/1347 349/12
2015/0371579 A1* 12/2015 Yu ........................ G09G 3/3208 345/690
2017/0177150 A1* 6/2017 Chang ...................... G09G 5/30
2018/0267313 A1* 9/2018 Kim ................... G02B 27/0172
2018/0268754 A1* 9/2018 Kim ..................... G09G 3/2011
2018/0342188 A1* 11/2018 Wang .................. G09G 3/2003
2020/0322583 A1 10/2020 Matsuki

FOREIGN PATENT DOCUMENTS

CN 102280074 A 12/2011
CN 103377487 A 10/2013
CN 109997354 A 7/2019

(Continued)

*Primary Examiner* — Jayesh A Patel
(74) *Attorney, Agent, or Firm* — Paratus Law Group, PLLC

(57) ABSTRACT

An information processing apparatus (20) according to the present disclosure includes a control unit (230). When a display image is displayed on a transmissive display in which real space is visually recognizable, a control unit (230) detects, from the display image, a transparent area through which the real space is seen. The control unit (230) corrects pixel values of at least a part of an area in the transparent area of the display image.

13 Claims, 15 Drawing Sheets

(56) References Cited

FOREIGN PATENT DOCUMENTS

| | | | | |
|---|---|---|---|---|
| JP | H07-067055 | A | | 3/1995 |
| JP | H11205788 | A | * | 7/1999 |
| JP | 2011-059215 | A | | 3/2011 |
| JP | 2016128893 | A | * | 7/2016 |
| JP | 2017-228848 | A | | 12/2017 |
| WO | WO-2017221663 | A1 | | 12/2017 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2020/042585 (filed on Nov. 16, 2020) under 35 U.S.C. § 371, which claims priority to Japanese Patent Application No. 2019-214424 (filed on Nov. 27, 2019), which are all hereby incorporated by reference in their entirety.

FIELD

The present disclosure relates to an information processing apparatus, an information processing method, and a program.

BACKGROUND

Conventionally, a technique for displaying an image on a transmissive display such as a head-mounted display or a head-up display has been known. In such a technology, a black image is displayed on a transmissive display by shielding an external image using a shutter for shielding an external image.

CITATION LIST

Patent Literature

Patent Literature 1: JP H07-67055 A

SUMMARY

Technical Problem

However, in the above-described technology, a mechanism for displaying a black image on a transmissive display such as a shutter for shielding an external image is necessary, and it cannot be said that the black image can be easily presented to the user. In addition, when light from the outside (external light) is strong, there is a problem that not only a black image but also an image having a dark color resembling black is difficult to see. As described above, the conventional technique has room for further improvement in terms of more easily improving the visibility of an image.

Therefore, the present disclosure proposes a technique that can more easily improve the visibility of an image.

Solution to Problem

According to the present disclosure, an information processing apparatus is provided. The information processing apparatus includes a control unit. When a display image is displayed on a transmissive display in which real space is visually recognizable, a control unit detects, from the display image, a transparent area through which the real space is seen. The control unit corrects pixel values of at least a part of an area in the transparent area of the display image.

DESCRIPTION OF EMBODIMENTS

Hereinafter, preferred embodiments of the present disclosure will be described in detail with reference to the accompanying drawings. Note that, in the present description and the drawings, components having substantially the same functional configuration are denoted by the same reference signs, and redundant description is omitted.

The description will be given in the following order.

1. Background
2. Overview of Embodiments
3. Exemplary Configuration of Embodiments
3.1. Exemplary System Configuration
3.2. Exemplary Functional Configuration
3.3. Detailed Exemplary Configuration
4. Example of Threshold Value Setting Processing
4.1. Prescribed Threshold Value
4.2. Threshold Value Based on Sensing Result
4.3. Threshold Value Based on Captured Image
5. Example of Pattern Determination Processing
5.1. Selection of Correction Pattern
5.2. Selection of Hatching
6. Example of Correction Processing
6.1. Case Where Replacement with Constant Value Is Made
6.2. Case Where Constant Value Is Added
6.3. Case Where Correction Is Made in Accordance with Background
7. Procedure of Image Processing
8. Modified Examples
9. Hardware Configuration
10. Supplement

1. BACKGROUND

Figure 1:
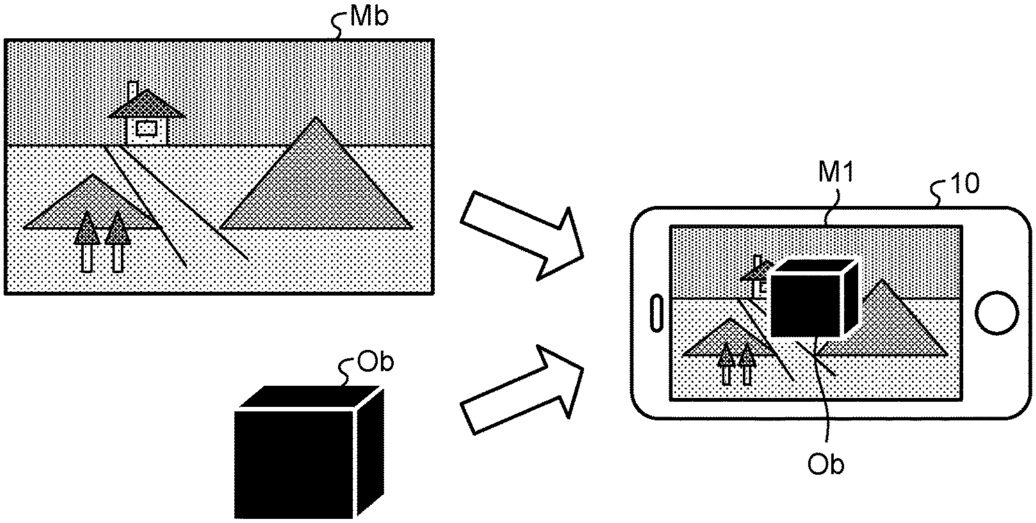
FIG. 1 is a diagram for explaining AR using a non-transmissive display.
Figure 2:
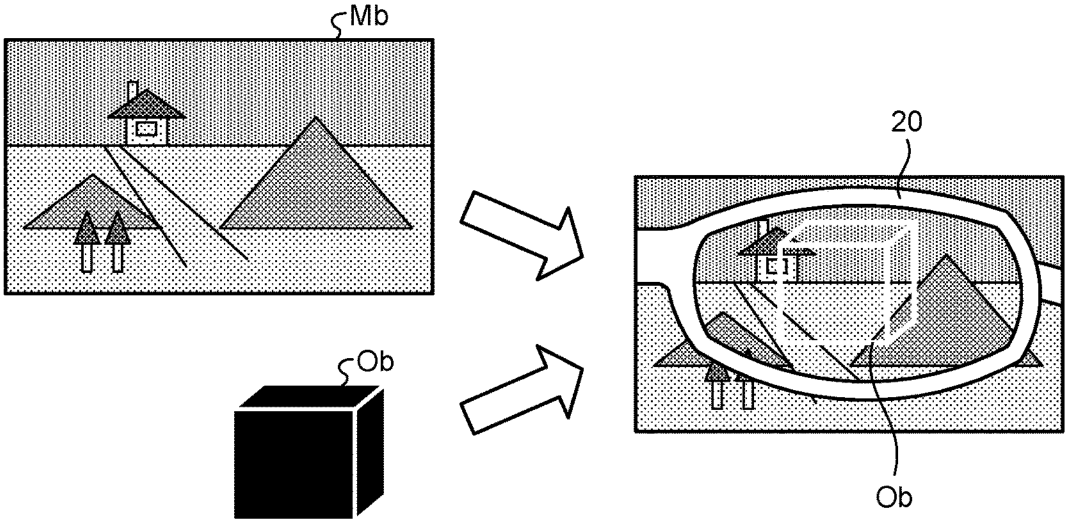
FIG. 2 is a diagram for explaining AR using a transmissive display.

First, before descriptions about the details of the embodiments of the present disclosure are made, a background that led up to creation of the embodiment of the present disclosure by the present inventors will be described with reference to FIGS. 1 and 2. FIG. 1 is a diagram for explaining AR using a non-transmissive display. In addition, FIG. 2 is a diagram for explaining AR using a transmissive display.

In augmented reality (AR) technology, as a method of displaying a virtual object in a superimposed manner in real space, a method of displaying a virtual object on a non-transmissive display such as a smartphone or a tablet terminal, and a method of displaying a virtual object on a transmissive display such as AR glasses have been known.

As illustrated in FIG. 1, it is assumed that, for example, a virtual object Ob that is a black cube is superimposed on real space Mb and displayed on a screen M1 of a non-transmissive display such as a smartphone. In this case, as illustrated in FIG. 1, the video of the real space Mb and the virtual object Ob are displayed on the screen M1 in a superimposed manner.

On the other hand, in the case of a transmissive display such as AR glasses, the black color of the virtual object Ob is displayed as a transparent color. As illustrated in the right diagram of FIG. 2, when the user wearing the AR glasses displaying the virtual object Ob looks at the real space Mb, the black color of the virtual object Ob become transparent and the background is seen therethrough.

As described above, when a black image is displayed as it is on the transmissive display, the black color is displayed as a transparent color on the display, and thus a device for displaying the black color such as a shutter for blocking external light is required, for example.

Alternatively, it is necessary to create the virtual object Ob for the transmissive display, such as not using the black color in the virtual object Ob displayed on the transmissive display.

Furthermore, there is also a method of improving the visibility of an image by lowering the transmittance of a transparent member (for example, glass or the like) that displays an image to lower the luminance of the background, like sunglasses, for example. However, when the luminance of the background is reduced, the view of the background is different from the actual view. For example, when a virtual object is displayed in a real space in a superimposed manner as in AR, the background that can be visually recognized through the transmissive display is desirably the same as the actual background, for displaying the virtual object such that the virtual object blends into the reality.

As described above, in the conventional technique, an image with high visibility is difficult to present on a transmissive display in some cases.

Therefore, from the viewpoint of the above circumstances, the information processing system according to the present embodiment has been created. The information processing system according to the present embodiment can present an image with improved visibility on the transmissive display, and thus, even when the image includes, for example, a black area of the image, the user can visually recognize the image more reliably.

Note that, although the display that displays an AR image as the transmissive display has been described here, the transmissive display to which the technology according to the present embodiment is applied is not limited thereto. For example, the technology according to the present embodiment may be applied to a transmissive display that displays advertisements, videos, and the like using a transmissive member such as window glass, as a display unit.

2. OVERVIEW OF EMBODIMENTS

Figure 3:
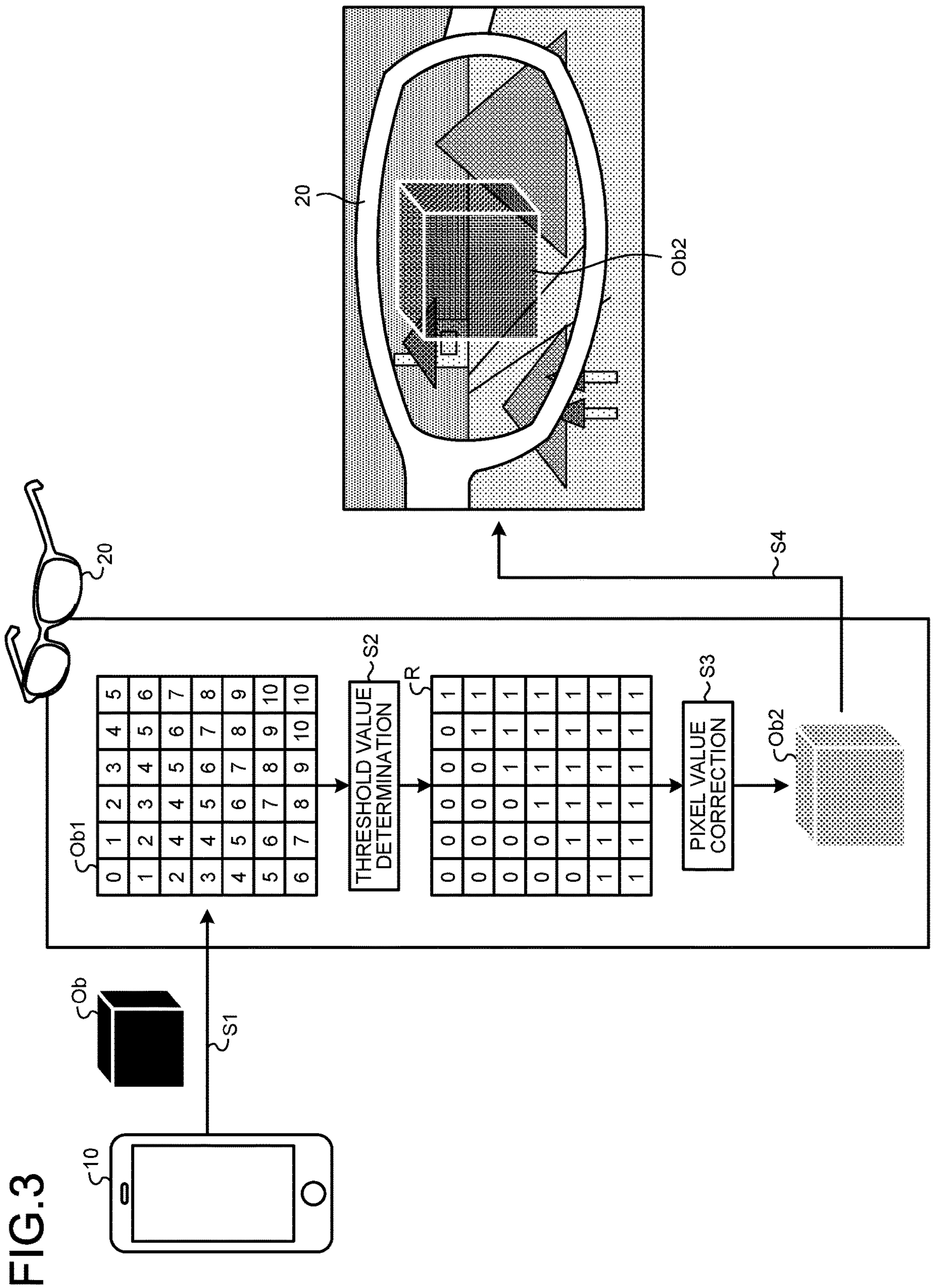
FIG. 3 is a diagram for explaining image processing according to the present embodiment.

First, an overview of image processing according to the present embodiment will be described with reference to FIG. 3. FIG. 3 is a diagram for explaining image processing according to the present embodiment. Here, as illustrated in FIG. 3, descriptions will be made for a case where an image is displayed on AR glasses (hereinafter, also referred to as AR glasses 20) as a transmissive display device 20 from a smartphone (hereinafter, also referred to as a smartphone 10) as an information processing apparatus 10.

First, the smartphone 10 transmits the virtual object Ob to be displayed on the AR glasses 20 (Step S1). The virtual object Ob has, for example, a pixel value for each pixel. Upon receiving the virtual object Ob from the smartphone 10, the AR glasses 20 store, for example, the pixel value of each pixel in the memory as virtual object information Ob1.

Note that the virtual object information Ob1 illustrated in FIG. 3 is an example, and is different from the actual pixel value of the virtual object Ob in FIG. 3. Furthermore, to simplify the description, FIG. 3 illustrates a case where the virtual object information Ob1 has one pixel value for each pixel, that is, the virtual object information Ob1 is grayscale, but the present disclosure is not limited thereto. For example, the virtual object information Ob1 may be color image information having three pixel values of R, G, and B for each pixel.

The AR glasses 20 perform threshold value determination of comparing the pixel value of each pixel of the virtual object information Ob1 with the threshold value (Step S2). For example, as illustrated in a comparison result R of FIG. 3, the AR glasses 20 compare the pixel value of the virtual object information Ob1 with the threshold value, and determine a pixel whose pixel value is less than the threshold value as "0", and determine a pixel whose pixel value is the threshold value or more as "1". The AR glasses 20 detect, when an area of the pixel determined as "0" is displayed on the transmissive display, the area as a transparent area through which the background is seen. Note that, in FIG. 3, the threshold value is set to "5", and as illustrated in the comparison result R, a pixel having a pixel value of less than "5" is set to "0", and a pixel having a pixel value of "5" or more is set to "1".

As described above, the AR glasses 20 may detect not only a black pixel, namely, a pixel having a pixel value of "0", but also an area of a color through which the background is seen by the blackish transmissive display and that is difficult for the user to visually recognize (transparent area). That is, the threshold value used for the threshold value determination in Step S2 may be a threshold value for detecting the black area of the virtual object Ob, or may be a threshold value for detecting the transparent area including the black area. Details of the threshold value will be described later with reference to FIGS. 7 to 10.

Subsequently, the AR glasses 20 correct the pixel value of the transparent area of the virtual object information Ob1 (Step S3). For example, the AR glasses 20 correct the pixel value of the pixel included in the transparent area such that the correct value is larger than the original value. More specifically, the AR glasses 20 correct the transparent area by adding the correction value to the pixel value of the pixel in the transparent area. In this way, as illustrated in FIG. 3, the AR glasses 20 generate a corrected virtual object Ob2 in which the black area is color-converted into gray.

The AR glasses 20 display the corrected virtual object Ob2 on the transmissive display (Step S4). Since the corrected virtual object Ob2 is corrected such that the transparent area is displayed in gray, the user can visually recognize the corrected virtual object Ob2 on the transmissive display with the real space as the background.

As described above, in the image processing according to the present embodiment, a transparent area that is transparent and difficult to be visually recognized on the transmissive display, such as black of the virtual object Ob for example, is detected, and the pixel value of the detected transparent area is corrected. This makes it possible to improve the visibility of the transparent area even without a device for displaying black. In addition, it is not necessary to prepare the virtual object Ob for the transmissive display, and the virtual object Ob to be displayed on the non-transmissive display can be displayed on the transmissive display.

Note that the image processing illustrated in FIG. 3 is merely an example, and the image processing with respect to the image to be displayed on the transmissive display according to the present embodiment is not limited to the above-described example. Hereinafter, a specific example of the image processing according to the present embodiment and a configuration for executing the image processing will be described in detail.

3. EXEMPLARY CONFIGURATION OF EMBODIMENTS

3.1. Exemplary System Configuration

Figure 4:
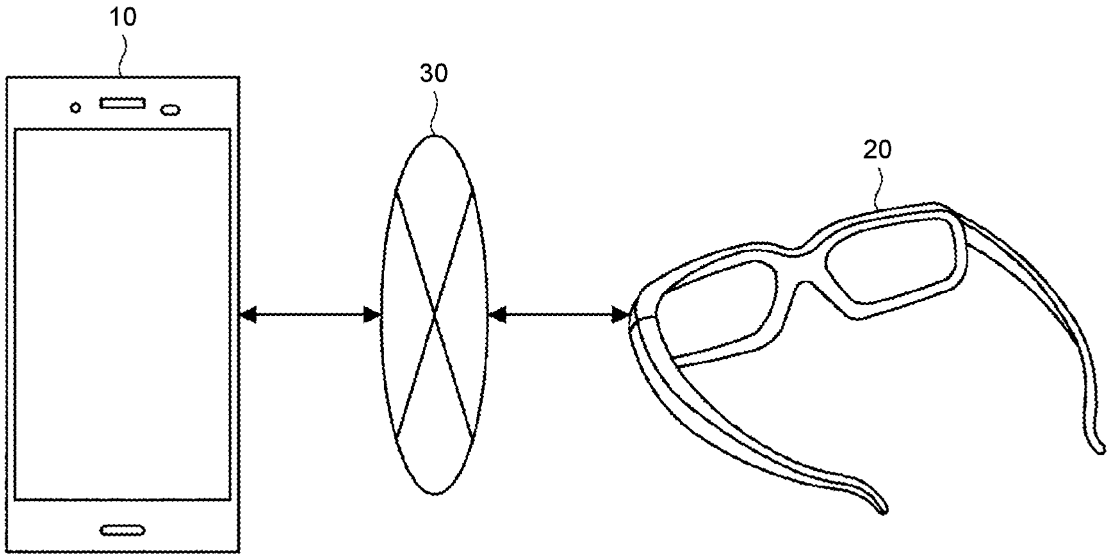
FIG. 4 is a diagram illustrating an exemplary configuration of an information processing system according to the present embodiment.

Next, an exemplary configuration of the information processing system according to the present embodiment will be described. FIG. 4 is a diagram illustrating an exemplary configuration of the information processing system according to the present embodiment. As illustrated in FIG. 4, the information processing system includes an information processing apparatus 10 and a display device 20.

(Information Processing Apparatus)

The information processing apparatus 10 controls image display by the display device 20 via a network 30. The information processing apparatus 10 according to the present embodiment may be an electronic device suitable for carrying, for example, a smartphone, a tablet terminal, or a laptop PC. Alternatively, the information processing apparatus 10 according to the present embodiment may be a desktop PC or a server. Note that a case where the information processing apparatus 10 is a smartphone will be described below as an example.

(Display Device)

The display device 20 is a device that includes a transmissive display (display unit) and enables the user to visually recognize the real space and view AR content. The display device 20 according to the present embodiment may be, for example, AR glasses or a head-mounted display. Alternatively, the display device 20 according to the present embodiment can be adapted not only to the AR glasses and the head-mounted display but also to other forms of transmissive display. The other display device may be a display device that displays an image on a transparent display unit such as a head-up display or window glass. Furthermore, the display device 20 may be, for example, an external device that can be mounted on normal glasses or the like. Note that a case where the display device 20 is AR glasses will be described below as an example.

The information processing apparatus 10 and the display device 20 are connected to each other via the predetermined network 30. The type of the network 30 connecting the information processing apparatus 10 and the display device 20 is not particularly limited. As a specific example, the network 30 may include a so-called wireless network such as a network based on the Wi-Fi (registered trademark) standard. Furthermore, as another example, the network 30 may include the Internet, a dedicated line, a local area network (LAN), a wide area network (WAN), or the like. Furthermore, the network may include a plurality of networks, and a part or all of the networks may be configured as a wired network. Alternatively, the information processing apparatus 10 and the display device 20 may be coupled to each other via a cable. Furthermore, by mounting the information processing apparatus 10 such as a smartphone on the display device 20, the display device 20 and the information processing apparatus 10 may be directly connected to each other.

<3.2. Exemplary Functional Configuration of Information Processing Apparatus>

Figure 5:
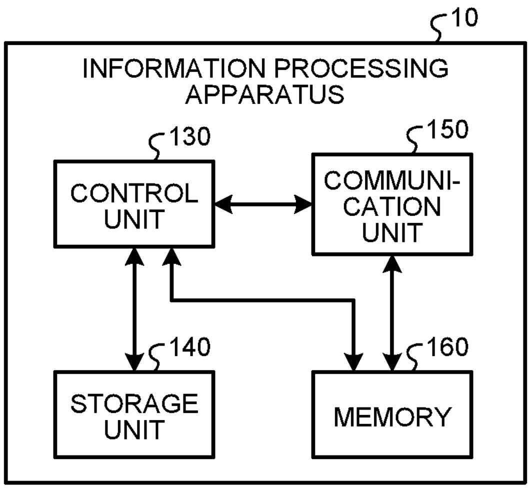
FIG. 5 is a block diagram illustrating an exemplary functional configuration of an information processing apparatus according to the present embodiment.

Next, an exemplary functional configuration of the information processing apparatus 10 according to the present embodiment will be described. FIG. 5 is a block diagram illustrating an exemplary functional configuration of the information processing apparatus 10 according to the present embodiment.

(Information Processing Apparatus)

The information processing apparatus 10 illustrated in FIG. 5 includes a control unit 130, a storage unit 140, a communication unit 150, and a memory 160. The information processing apparatus 10 controls image display of the display device 20 by transmitting an image to be displayed on the display device 20 to the display device 20.

(Control Unit)

The control unit 130 is, for example, a controller, and is implemented by executing various programs stored in a storage device inside the information processing apparatus 10 using a random access memory (RAM) as a work area by a central processing unit (CPU), a micro processing unit (MPU), or the like. For example, the various programs include a program of an application installed in the information processing apparatus 10. Furthermore, the control unit 130 is implemented by, for example, an integrated circuit such as an application specific integrated circuit (ASIC) or a field programmable gate array (FPGA).

For example, the control unit 130 transmits the image stored in the storage unit 140 to the display device 20 via the communication unit 150. The control unit 130 stores the acquired image in the memory 160, and transmits the image stored in the memory 160 to the display device 20.

Alternatively, the control unit 130 may acquire an image to be displayed on the display device 20 from an external device (not illustrated) such as a server via the communication unit 150, for example. Alternatively, the control unit 130 may acquire the image from a storage medium such as a USB or an SD card. The image acquired from the external device or the storage medium is stored in the storage unit 140 or the memory 160.

(Storage Unit)

The storage unit 140 is implemented by, for example, a semiconductor memory element such as a RAM or a flash memory, or a storage device such as a hard disk or an optical disk. The storage unit 140 stores programs, arithmetic parameters, and the like used for processing of the control unit 130. In addition, the storage unit 140 stores an image to be displayed on the display device 20.

(Communication Unit)

The communication unit 150 is a communication interface that is wiredly or wirelessly connected to the network 30 and communicates with other devices including the display device 20 via the network 30. The communication unit 150 makes a communication connection with a network by, for example, a wired/wireless local area network (LAN), Bluetooth (registered trademark), Wi-Fi (Wireless Fidelity, registered trademark), or the like.

(Memory)

The memory 160 stores image information to be transmitted from the control unit 130 to the display device 20. The memory 160 has a capacity for storing image information for one frame, for example.

<3.3. Exemplary Configuration of Display Device 20>

Figure 6:
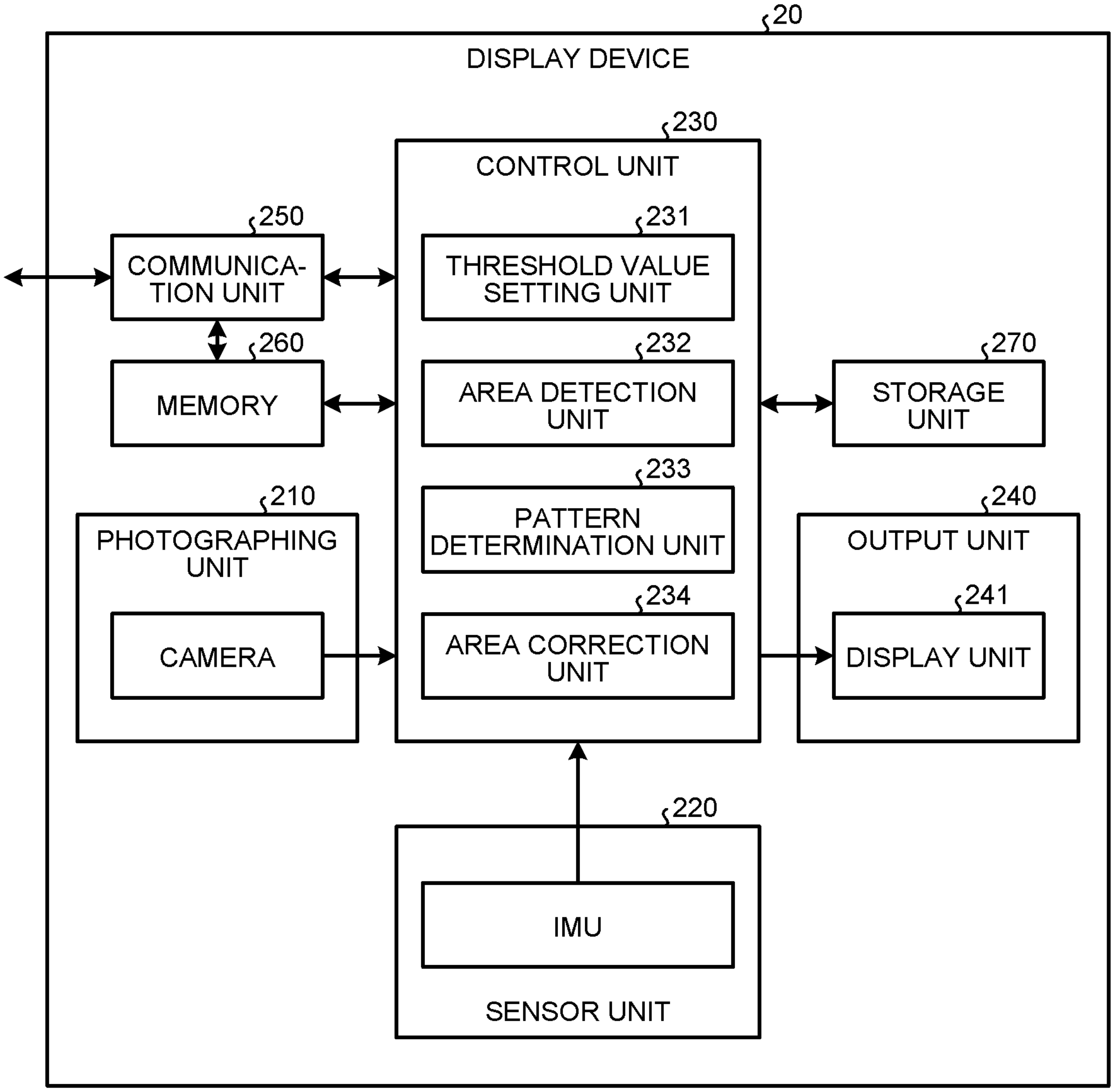
FIG. 6 is a block diagram illustrating an exemplary functional configuration of a display device according to the present embodiment.

Next, a function configuration of the display device 20 according to the present embodiment will be described. FIG. 6 is a block diagram illustrating an exemplary functional configuration of the display device 20 according to the present embodiment.

The display device 20 includes a photographing unit 210, a sensor unit 220, a control unit 230, an output unit 240, a communication unit 250, a memory 260, and a storage unit 270.

(Photographing Unit)

The photographing unit 210 includes a camera and has a function of photographing real space. The photographing unit 210 is disposed so as to be capable of photographing in the same direction as the direction in which a user visually recognizes the real space via the output unit 240, for example.

(Sensor Unit)

The sensor unit 220 has a function of collecting various types of sensor information such as acceleration and angular velocity. Furthermore, the sensor unit 220 includes an illuminance sensor, and detects an illuminance value of the real space. The sensor unit 220 includes, for example, an inertial measurement unit (IMU) including an acceleration sensor, a gyro, a geomagnetic sensor, and the like, and acquires sensor information such as acceleration information and angular velocity information.

(Control Unit)

The control unit 230 is, for example, a controller, and is implemented by executing various programs stored in a storage device inside the information processing apparatus 10 using a random access memory (RAM) as a work area by a central processing unit (CPU), a micro processing unit (MPU), or the like. Examples of the various programs include an information processing program that executes image processing. Furthermore, the control unit 230 is implemented by, for example, an integrated circuit such as an application specific integrated circuit (ASIC) or a field programmable gate array (FPGA).

The control unit 230 includes a threshold value setting unit 231, an area detection unit 232, a pattern determination unit 233, and an area correction unit 234, and implements or executes functions and effects of image processing described below. Note that the internal structure of the control unit 230 is not limited to the configuration illustrated in FIG. 6, and may be another configuration as long as image processing described later is performed.

(Threshold Value Setting Unit)

The threshold value setting unit 231 sets a threshold value used for threshold value determination by the area detection unit 232. The threshold value setting unit 231 sets, for example, a threshold value determined in advance. Alternatively, the threshold value setting unit 231 may set the threshold value on the basis of the sensing result of the sensor unit 220, or may set the threshold value on the basis of the imaging result of the photographing unit 210. Details of the threshold value setting processing by the threshold value setting unit 231 will be described later with reference to FIGS. 7 to 10.

(Area Detection Unit)

The area detection unit 232 uses the threshold value set by the threshold value setting unit 231 to perform threshold value determination on the pixel value of each pixel of the image transmitted from the information processing apparatus 10 (hereinafter, also referred to as a display image), thereby detecting the transparent area of the display image. The area detection unit 232 detects, for example, a pixel area in which a pixel value of a display image is less than a threshold value as a transparent area.

(Pattern Determination Unit)

The pattern determination unit 233 determines a correction pattern used when the area correction unit 234 corrects the transparent area detected by the area detection unit 232. The area correction unit 234 performs correction to fill the transparent area with the same color such as gray, for example. Alternatively, the area correction unit 234 performs correction such that the display image is displayed by applying hatching such as oblique lines to the transparent area. In this manner, the area correction unit 234 changes the correction pattern in accordance with the situation of the real space. The pattern determination unit 233 determines a correction pattern used for correction by the area correction unit 234. Note that details of the pattern determination processing by the pattern determination unit 233 will be described later with reference to FIGS. 11 to 20.

(Area Correction Unit)

The area correction unit 234 corrects the pixel value of the pixel in the transparent area detected by the area detection unit 232 in accordance with the correction pattern determined by the pattern determination unit 233. For example, when the pattern determination unit 233 selects a correction pattern for filling the transparent area, the area correction unit 234 corrects all the pixel values of the transparent area by converting the pixel values of the transparent area into a predetermined value. Alternatively, the area correction unit 234 may correct the transparent area by adding a predetermined value to the pixel value of the transparent area.

In addition, when the pattern determination unit 233 selects a correction pattern for hatching the transparent area, the area correction unit 234 corrects pixel values of at least some pixels of the transparent area such that the display image is displayed with the transparent area applied to hatching. Note that details of the correction by the area correction unit 234 will be described later with reference to FIGS. 21 to 25.

(Output Unit)

The output unit 240 displays, for example, content such as an image on the basis of control by the control unit 130 or the control unit 230. The output unit 240 includes at least a display unit 241 that is a transmissive display. Furthermore, the output unit 240 may include a speaker or the like for outputting sound.

(Communication Unit)

The communication unit 250 is a communication interface that is wiredly or wirelessly connected to the network 30 and communicates with other devices including the information processing apparatus 10 via the network 30. The communication unit 250 makes a communication connection with a network by, for example, a wired/wireless local area network (LAN), Bluetooth (registered trademark), Wi-Fi (Wireless Fidelity, registered trademark), or the like.

(Memory)

The memory 260 stores the image information to be transmitted from the information processing apparatus 10. The memory 260 has a capacity for storing image information for one frame, for example. Alternatively, the memory 260 may store the threshold value determination result in the image processing.

(Storage Unit)

The storage unit 270 is implemented by, for example, a semiconductor memory element such as a RAM or a flash memory, or a storage device such as a hard disk or an optical disk. The storage unit 270 stores programs, arithmetic parameters, and the like used for processing of the control unit 230.

An exemplary functional configurations of the information processing apparatus 10 and the display device 20 according to the present embodiment have been described.

Note that the above-described configurations described with reference to FIGS. 5 and 6 are merely an example, and the functional configurations of the information processing apparatus 10 and the display device 20 according to the present embodiment are not limited to the example. For example, the display device 20 according to the present embodiment can solely display content including an image, without depending on the control by the information processing apparatus 10.

4. EXAMPLE OF THRESHOLD VALUE SETTING PROCESSING

Next, threshold value setting processing by the threshold value setting unit 231 will be described. The display device 20 according to the present embodiment detects the transparent area from the display image using, for example, any one of (1) a prescribed threshold value, (2) a threshold value according to a sensing result of the sensor unit 220, and (3) a threshold value according to an imaging result of the photographing unit 210. Hereinafter, the threshold value set by the threshold value setting unit 231 will be described separately for the above-described three cases.

<4.1. Prescribed Threshold Value>

(Threshold Value for Detecting Black Area)

Figure 7:
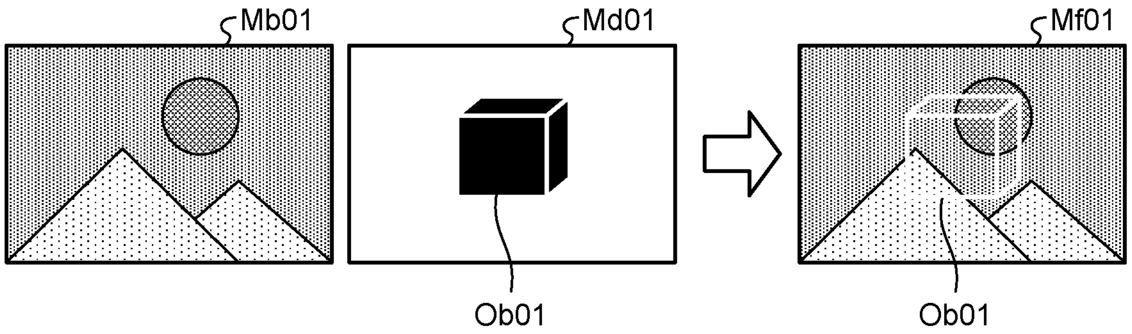
FIG. 7 is a diagram for explaining a threshold value set by a threshold value setting unit according to the present embodiment.

FIG. 7 is a diagram for explaining a threshold value set by the threshold value setting unit 231 according to the present embodiment. As illustrated in FIG. 7, it is assumed that the display device 20 displays a display image Md01 including an object Ob01 in real space serving as a background on the display unit 241 (hereinafter, also referred to as a background Mb01). The object Ob01 includes a pixel having pixel values (0, 0, 0). Thus, the pixel of the display image includes three pixel values (R, G, B). That is, the display image is a color image.

When the display image Md01 is displayed on the display unit 241 in which the background Mb01 illustrated in FIG. 7 is visually recognized, the area having the pixel values (0, 0, 0) is displayed as an area having the transparent color on the display unit 241, whereby the corresponding area of the object Ob01 is transparent as illustrated in a screen Mf01.

In this case, the threshold value setting unit 231 sets a threshold value for determining whether or not the pixel value of the display image Md01 is 0. Note that when the display image Md01 is a color image, the threshold value setting unit 231 sets the threshold value of each of the pixel values (R, G, B), as described above.

(Threshold Value for Detecting Transparent Area Having a Color Close to Black)

Alternatively, the threshold value setting unit 231 may set a threshold value such that the area detection unit 232 detects, in addition to black, a transparent area having a color close to black. This point will be described with reference to FIG. 8.

Figure 8:
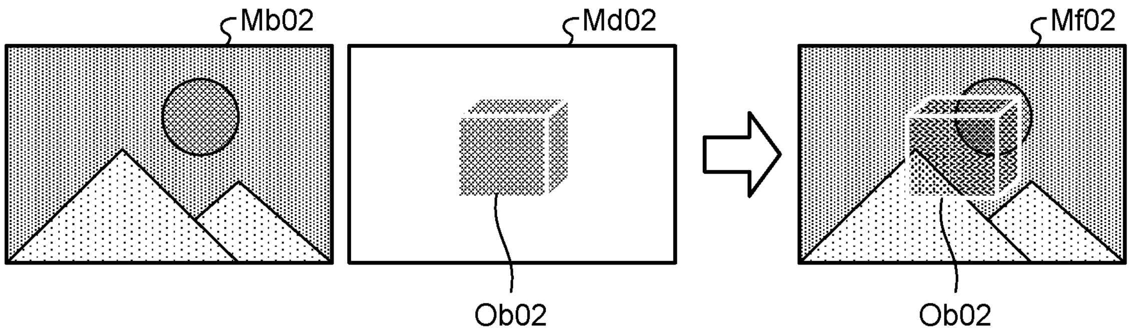
FIG. 8 is a diagram for explaining a threshold value set by the threshold value setting unit according to the present embodiment.

FIG. 8 is a diagram for explaining a threshold value set by the threshold value setting unit 231 according to the present embodiment. It is assumed that a display image Md02 including an object Ob02 having the dark red area is displayed on the display unit 241. In this case, the pixels in the dark red area of the object Ob02 have, for example, pixel values (75, 0, 0). Thus, when displayed on the display unit 241, the pixels are displayed in red as illustrated in a screen Mf02. However, since the pixel values are small, the background Mb01 is seen through due to high transparency. Therefore, the visibility of the dark red area of the display image Md01 is lowered.

As such, in the display device 20 according to the present embodiment, the visibility of the transparent area is improved by correcting the transparent area having high transparency and low visibility. To this end, the threshold value setting unit 231 sets a threshold value for detecting the transparent area by the area detection unit 232. It is assumed that the threshold value is a value determined in advance by an experiment, simulation, or the like, and is stored in a storage unit (not illustrated) of the display device 20.

The threshold value setting unit 231 sets a value determined in advance as the threshold value in this manner, whereby the area detection unit 232 can detect the transparent area including the black area.

<4.2. Threshold Value Based on Sensing Result>

Subsequently, a case where the threshold value setting unit 231 sets the threshold value on the basis of the sensing result of the sensor unit 220 will be described with reference to FIGS. 9 and 10.

As described above, the black area of the display image is displayed in the transparent color on the display unit 241. On the other hand, since the transparent area excluding black is not completely black, such a transparent area is displayed on the display unit 241 in a display color corresponding to the pixel values. Accordingly, the visibility of the transparent area excluding black depends on the brightness of the background. This point will be described with reference to FIGS. 9 and 10. FIGS. 9 and 10 are diagrams for explaining a threshold value set by the threshold value setting unit 231 according to the present embodiment.

Figure 9:
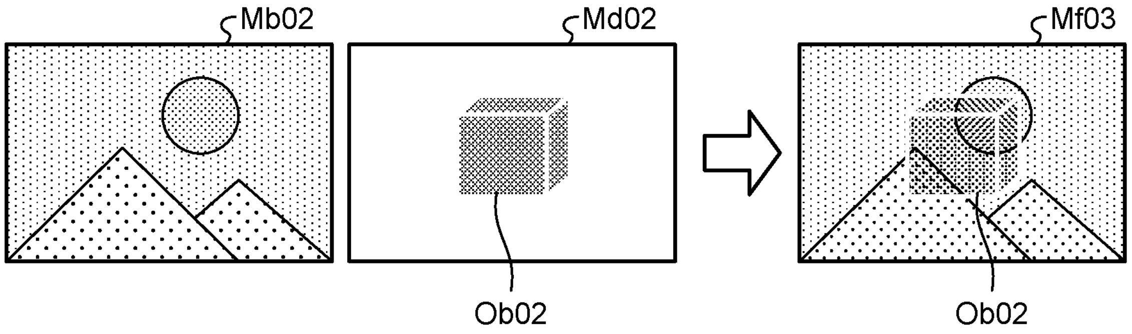
FIG. 9 is a diagram for explaining a threshold value set by the threshold value setting unit according to the present embodiment.

As illustrated in FIG. 9, when the display image Md02 including the dark red object Ob02 is displayed on a bright background Mb02, the transparency of the object Ob02 increases in a screen Mf03 of the display unit 241, and the object Ob02 is difficult to visually recognize.

Figure 10:
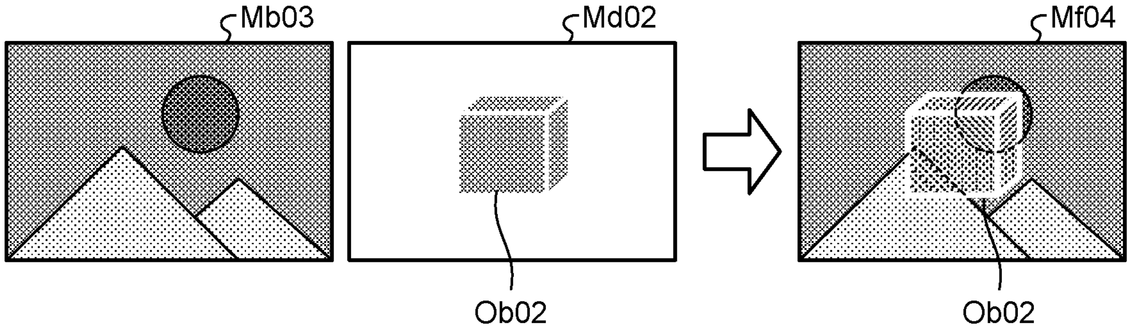
FIG. 10 is a diagram for explaining a threshold value set by the threshold value setting unit according to the present embodiment.

On the other hand, as illustrated in FIG. 10, when the display image Md02 including the dark red object Ob02 is displayed on a dark background Mb03, the transparency of the object Ob02 in a screen Mf04 of the display unit 241 becomes lower than that in the case of the bright background Mb02, and the object Ob02 can be visually recognized easily.

Thus, the visibility of the transparent area of the display image depends on the brightness of the background, namely, the real space. As such, the threshold value setting unit 231 according to the present embodiment sets the threshold value in accordance with the brightness of the real space. Specifically, the threshold value setting unit 231 sets the threshold value on the basis of an illuminance value that is a sensing result of the illuminance sensor of the sensor unit 220. For example, a table in which the illuminance value and the threshold value are associated with each other is stored in advance in the storage unit, and the threshold value setting unit 231 sets the threshold value according to the illuminance value by referring to the table. Note that the table in which the illuminance value and the threshold value are associated with each other is assumed to be created in advance by experiment, simulation, or the like.

Note that the threshold value setting unit 231 is assumed here to set the threshold value on the basis of the illuminance value detected by the illuminance sensor, but the present disclosure is not limited thereto. The threshold value setting unit 231 may set the threshold value using an automatic exposure (AE) function that the photographing unit 210 has. In this case, the threshold value setting unit 231 sets the threshold value, for example, with reference to a table in which the exposure value set by the photographing unit 210 and the threshold value are associated with each other. Note that the table in which the exposure value and the threshold value are associated with each other is assumed to be created in advance by experiment, simulation, or the like and stored in the storage unit 270.

Alternatively, the threshold value setting unit 231 may, for example, set the threshold value in accordance with the place of the display unit 241. In this case, the threshold value setting unit 231 sets the threshold value in accordance with, for example, whether the display device 20 is used outdoors or indoors. Specifically, the threshold value setting unit 231 sets the threshold value when the display device 20 is used outdoors to be higher than the threshold value when the display device 20 is used indoors. This is because the real space is considered to be brighter in the outdoors than the indoors. The place of use of the display device 20 may be set by the user, or may be detected using a sensor such as a GPS.

Furthermore, the threshold value setting unit 231 may, for example, set the threshold value in accordance with the time at which the display image is displayed on the display unit 241, the weather, or the like. Specifically, in a case where the display image is displayed, for example, in the daytime, the threshold value setting unit 231 sets the threshold value to be higher than that in a case where the display image is displayed in the nighttime. Alternatively, the threshold value setting unit 231 may set the threshold value to be higher in good weather than in rainy weather.

In this manner, the threshold value setting unit 231 sets the threshold value on the basis of the sensing result of the sensor unit 220 and additional information such as a place, time, and weather. In this way, the area detection unit 232 can detect the transparent area with lower visibility.

<4.3. Threshold Value Based on Captured Image>

A case where the threshold value setting unit 231 sets the threshold value on the basis of the captured image taken by the photographing unit 210 with the camera will be described.

The illuminance value detected by the illuminance sensor of the sensor unit 220 is an average value of the brightness of the background. The brightness of the actual background may vary depending on a place due to an influence of an object disposed in real space such as a building or furniture. In this case, the visibility of the display image displayed on the display unit 241 varies depending on the display place of the display unit 241. This point will be described with reference to FIG. 11.

Figure 11:
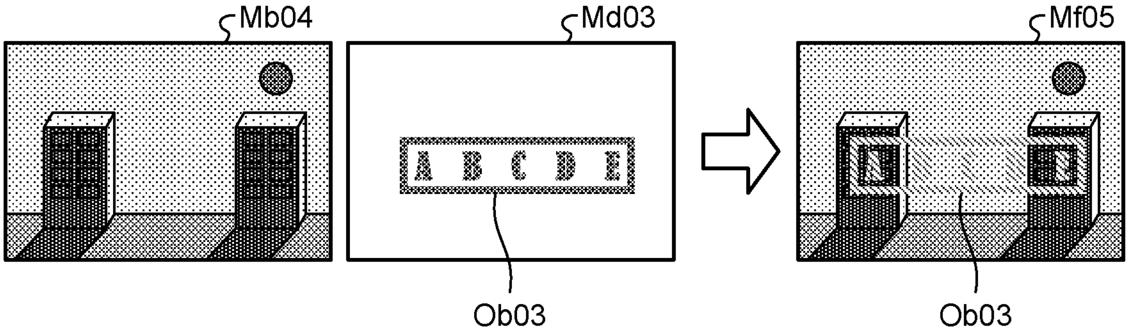
FIG. 11 is a diagram for explaining a threshold value set by the threshold value setting unit according to the present embodiment.

FIG. 11 is a diagram for explaining a threshold value set by the threshold value setting unit 231 according to the present embodiment. As illustrated in FIG. 11, it is assumed that a display image Md03 including an object Ob03 is displayed on a background Mb04 including two buildings. Note that the object Ob03 is a dark gray character string. In this manner, the object included in the display image is not limited to the virtual object or the image, and may include a character string.

The background Mb04 in FIG. 11 includes two buildings as described above. Therefore, the building and the shadow portion generated by the building of the background Mb04 are darker than other portions. Accordingly, as illustrated in a screen Mf05, when the display image Md03 is displayed directly superimposed on the background Mb04, a building or a shadow portion can be visually recognized for example, but the object Ob03 may be difficult to visually recognize due to the object Ob03 being transparent.

As described above, in a case where the brightness of the background Mb04 varies, if the threshold value is set on the basis of the illuminance value that is the average value of the brightness, the threshold value setting unit 231 may set the threshold value on the basis of the illuminance value darker than the actual brightness. Therefore, the threshold value of the threshold value setting unit 231 cannot be appropriately set, and the area detection unit 232 may not be able to detect the transparent area.

As such, the threshold value setting unit 231 according to the present embodiment sets the threshold value on the basis of the image captured by the photographing unit 210. In this way, even when the brightness of the background Mb04 varies, the threshold value setting unit 231 can appropriately set the threshold value.

Specifically, the threshold value setting unit 231 sets the threshold value of each pixel of the display image (hereinafter, also referred to as a display pixel) on the basis of the pixel value of each pixel of the captured image (hereinafter, also referred to as an imaging pixel).

For example, a table in which the imaging pixel and the threshold value are associated with each other is stored in advance in the storage unit, and the threshold value setting unit 231 sets the threshold value according to the pixel value of the imaging pixel corresponding to the display pixel as the threshold value of the display pixel, by referring to the table. Note that the table in which the imaging pixel and the threshold value are associated with each other is assumed to be created in advance by experiment, simulation, or the like.

Note that the threshold value setting unit 231 sets the threshold value for each display pixel here, but the present disclosure is not limited thereto. The threshold value setting unit 231 may divide the display image into predetermined areas and set the threshold value for each of the predetermined areas. In this case, the threshold value setting unit 231 sets the threshold value in accordance with, for example, the average value of the pixel values of the predetermined area. Note that the predetermined area may be an area obtained by dividing the display image at equal intervals, or may be an area obtained by dividing the display image in accordance with the feature value included in the display image. In this case, the threshold value setting unit 231 may, for example, detect an edge from the display image as the feature value and set the threshold value of a predetermined area with the area divided by the detected edge defined as the predetermined area.

In this manner, the threshold value setting unit 231 can also set the threshold value on the basis of the captured image. Accordingly, even when the brightness of the background varies, the area detection unit 232 can more appropriately detect the transparent area.

(Area Detection Processing)

The area detection unit 232 performs threshold value determination on the pixel value of each pixel in the display image by using the threshold value set by the threshold value setting unit 231 on the basis of the prescribed value or the imaging pixel. The area detection unit 232 compares respective pixel values (R, G, B) of each pixel in the display image with a threshold value. As a result of the threshold value determination, the area detection unit 232 detects, as a transparent area, a pixel in which all pixel values (R, G, B) are less than the threshold value. Note that, when a plurality of pixels detected as the transparent area are adjacent to each other, the area detection unit 232 deems the plurality of pixels as one transparent area. The area detection unit 232 may detect a plurality of transparent areas.

5. EXAMPLE OF PATTERN DETERMINATION PROCESSING

<5.1. Selection of Correction Pattern>

Next, pattern determination processing by the pattern determination unit 233 will be described. As described above, the pattern determination unit 233 selects, as the correction pattern, a correction pattern in which the transparent area is filled with the same color (hereinafter, also referred to as a fill pattern) or a correction pattern in which correction is performed by applying hatching (hereinafter, also referred to as a hatching pattern). The pattern determination unit 233 selects a correction pattern in accordance with, for example, the shape or texture of an object included in the background. Alternatively, the pattern determination unit 233 may select a correction pattern in accordance with the brightness of the background.

Figure 12:
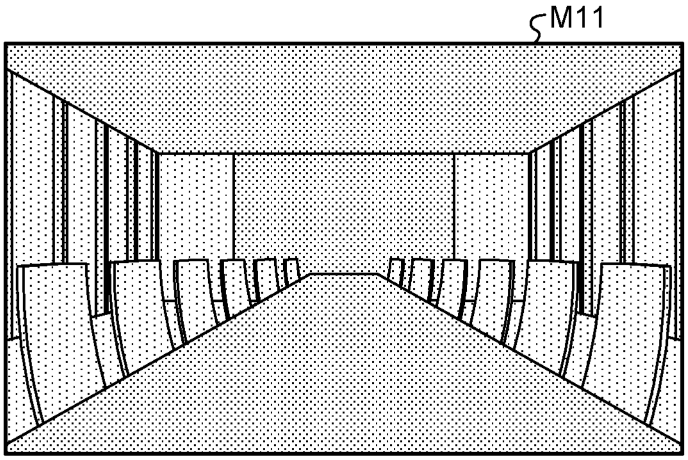
FIG. 12 is a diagram for explaining pattern determination processing by a pattern determination unit according to the present embodiment.
Figure 13:
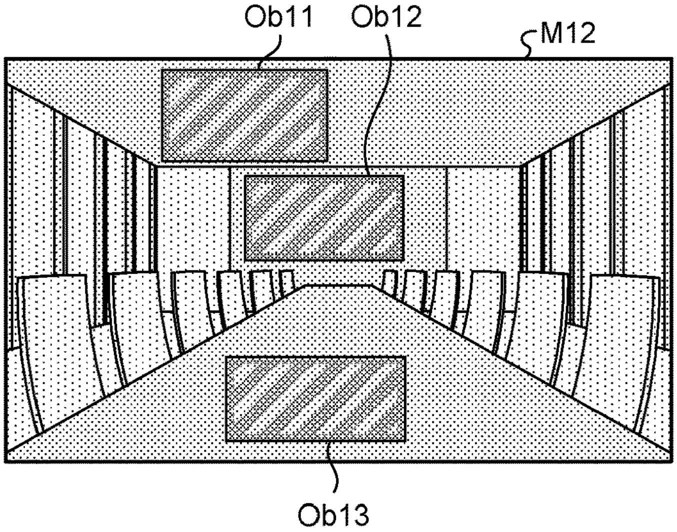
FIG. 13 is a diagram for explaining pattern determination processing by the pattern determination unit according to the present embodiment.

For example, as illustrated in FIG. 12, when a background M11 includes an object with a small texture such as a wall or a table, and the transparent area is displayed in a manner of being superimposed on such an object, the pattern determination unit 233 selects a hatching pattern as the correction pattern. In this case, the area correction unit 234 corrects the transparent area with the hatching pattern, whereby the visibility of transparent areas Ob11 to Ob13 can be further improved as illustrated in a screen M12 of FIG. 13. Note that FIGS. 12 and 13 are diagrams for explaining pattern determination processing by the pattern determination unit 233 according to the present embodiment.

The pattern determination unit 233 extracts a feature value of a background area overlapping with the transparent area when, for example, the transparent area detected by the area detection unit 232 is displayed on the display unit 241 (hereinafter, this background area is also referred to as a transparent background area). The pattern determination unit 233 selects a fill pattern as the correction pattern when the number of feature values included in the transparent background area is a predetermined number or more, and selects a hatching pattern when the number of feature values is less than the predetermined number. Note that examples of the feature value include an edge included in the background.

Alternatively, the pattern determination unit 233 may determine a correction pattern in accordance with the brightness of the background. For example, too bright background may prevent the improvement of the visibility of the transparent area by correction with the fill pattern. In this case, the pattern determination unit 233 selects the hatching pattern as the correction pattern when the brightness of the transparent background area is a predetermined value or more, and selects the fill pattern when the brightness is less than the predetermined value. Note that the brightness of the transparent background area may be an illuminance value of the illuminance sensor, or may be a pixel value of the transparent background area (when a plurality of pixels are included in the transparent background area, for example, an average value of the plurality of pixel values) in the captured image.

<5.2. Selection of Hatching>

When selecting the hatching pattern as the correction pattern, the pattern determination unit 233 determines the type of hatching. Examples of the type of hatching include a "line pattern" in which the transparent area is marked with oblique lines and a "dot pattern" in which the transparent area is dotted. In addition, there is a pattern in which a predetermined design is added, or the like. Moreover, the "line pattern" also includes, for example, a plurality of hatching patterns according to a line type (dotted line, chain line), a line thickness, an interval, a line angle, and the like.

The pattern determination unit 233 selects, from among the plurality of hatching patterns, a hatching pattern that further improves the visibility for the user according to, for example, the shape or texture of an object included in the background. This point will be described with reference to FIGS. 14 to 17. FIGS. 14 to 17 are diagrams for explaining pattern determination processing by the pattern determination unit 233 according to the present embodiment.

Figure 14:
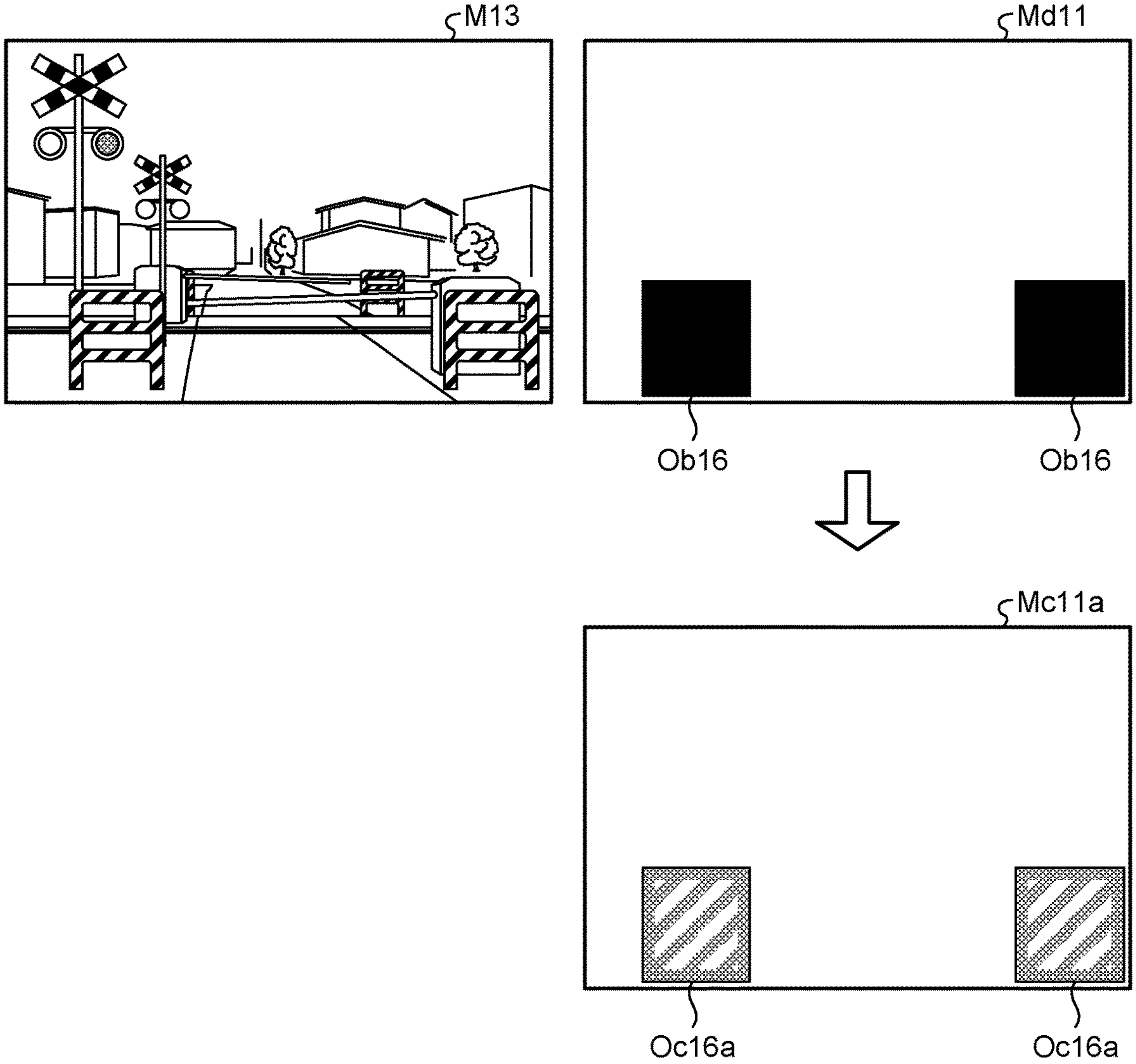
FIG. 14 is a diagram for explaining pattern determination processing by the pattern determination unit according to the present embodiment.

As illustrated in FIG. 14, for example, when a background M13 includes a railroad crossing, the display device 20 is assumed to display a black image Ob16 on the display unit 241 in a manner of being superimposed on the railroad crossing warning fence. At this time, when the pattern determination unit 233 selects the oblique line pattern as the correction pattern, the area correction unit 234 generates a corrected image Mc11*a* including a corrected image Oc16*a* by correcting the black image Ob16 with the oblique line pattern.

Figure 15:
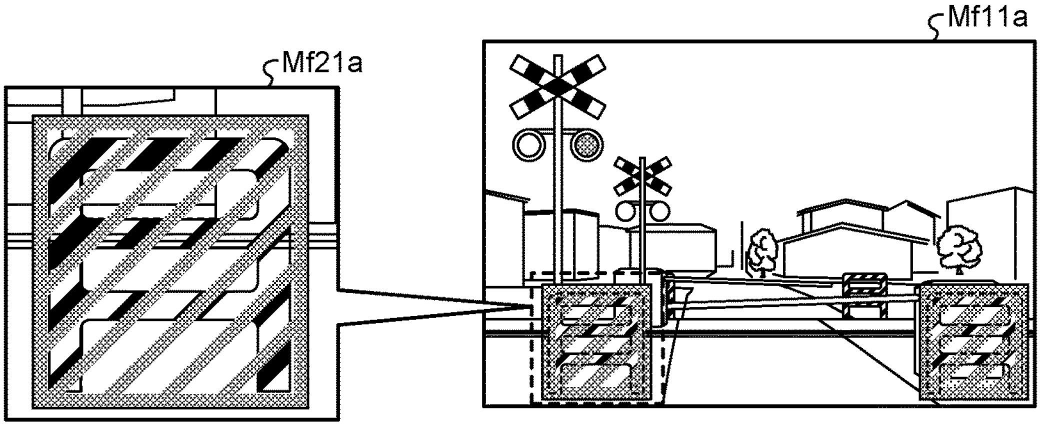
FIG. 15 is a diagram for explaining pattern determination processing by the pattern determination unit according to the present embodiment.

When the corrected image Mc11*a* is displayed superimposed on the background M13, the oblique lines of the railroad crossing warning fence and the oblique line pattern of the corrected image Oc16*a* are displayed overlapping with each other as illustrated in screens Mf11*a* and Mf21*a* of FIG. 15, and the visibility of the corrected image Oc16*a* is reduced. Note that the screen Mf21*a* is obtained by enlarging a part of the screen Mf11*a*.

As described above, when a hatching pattern similar to the texture pattern of the transparent background area is selected, the visibility of the corrected transparent area may be reduced. Therefore, the pattern determination unit 233 selects a hatching pattern different from the texture pattern of the transparent background area from among the hatching patterns.

Figure 16:
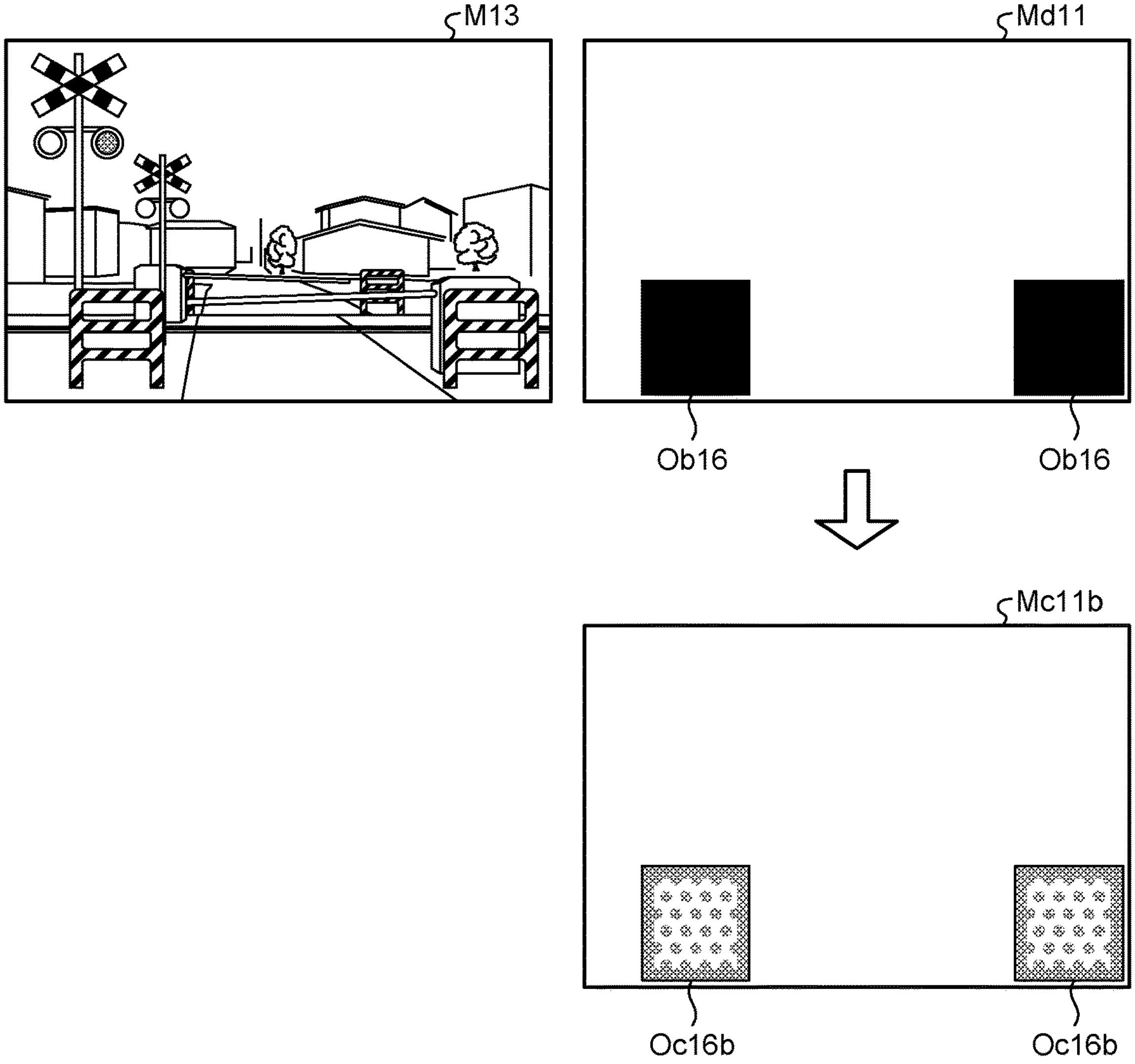
FIG. 16 is a diagram for explaining pattern determination processing by the pattern determination unit according to the present embodiment.

For example, as illustrated in FIG. 16, when there is a texture pattern of oblique lines in the transparent background area, the pattern determination unit 233 selects a hatching pattern of the dot pattern. In this case, the area correction unit 234 generates a corrected image Mc11*b* including a corrected image Oc16*b* by correcting the black image Ob16 with the dot pattern.

Figure 17:
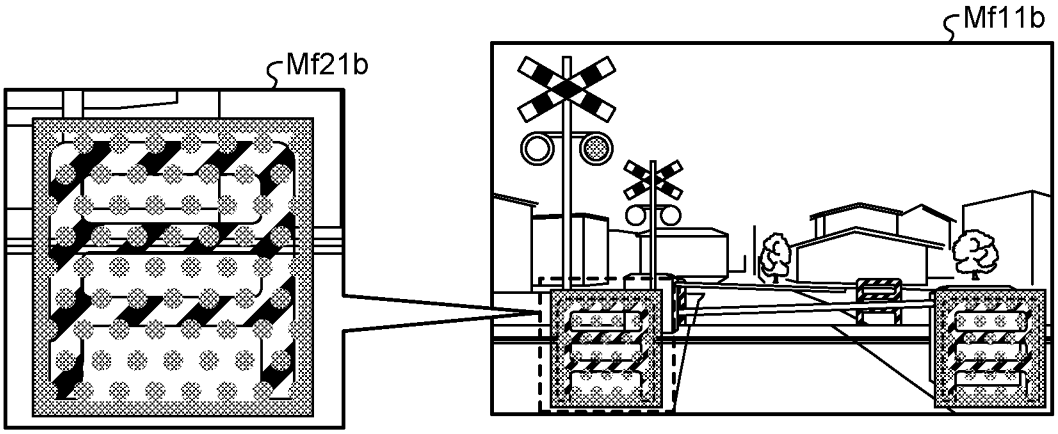
FIG. 17 is a diagram for explaining pattern determination processing by the pattern determination unit according to the present embodiment.

When the corrected image Mc11*b* is displayed superimposed on the background M13, the oblique lines of the railroad crossing warning fence and the dot pattern of the corrected image Oc16*b* are displayed overlapping each other as illustrated in screens Mf11*b* and Mf21*b* of FIG. 17. By selecting a hatching pattern different from the texture pattern of the transparent background area in this manner, a reduction in the visibility of the corrected image Oc16*b* is suppressed. Note that the screen Mf21*b* is obtained by enlarging a part of the screen Mf11*b*.

Figure 18:
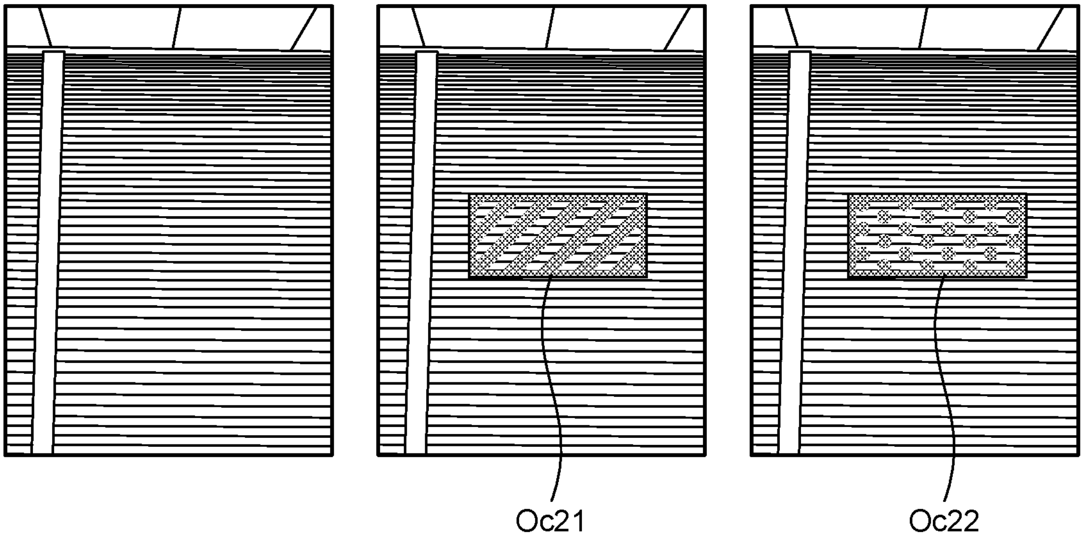
FIG. 18 is a diagram for explaining pattern determination processing by the pattern determination unit according to the present embodiment.
Figure 19:
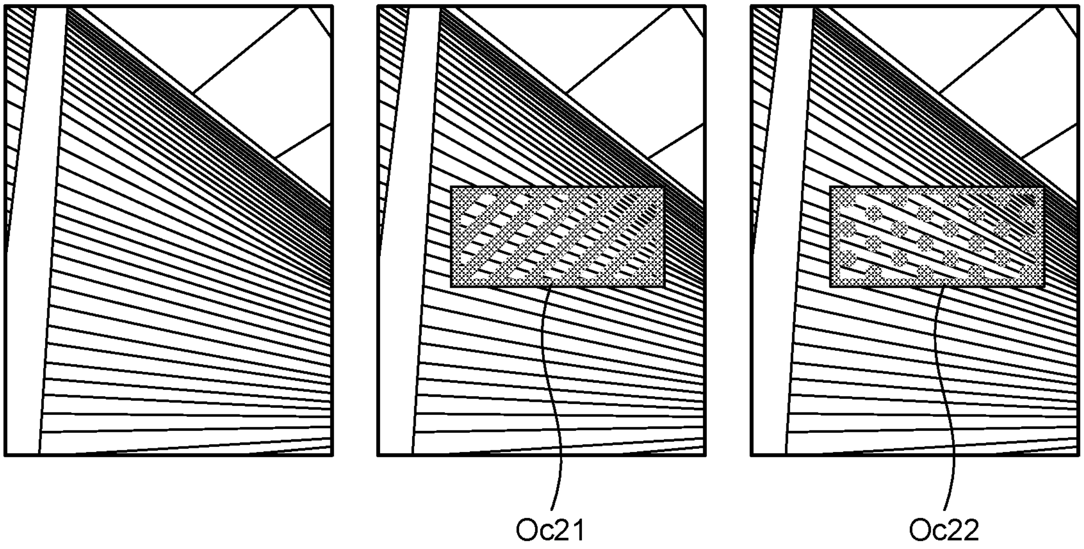
FIG. 19 is a diagram for explaining pattern determination processing by the pattern determination unit according to the present embodiment.
Figure 20:
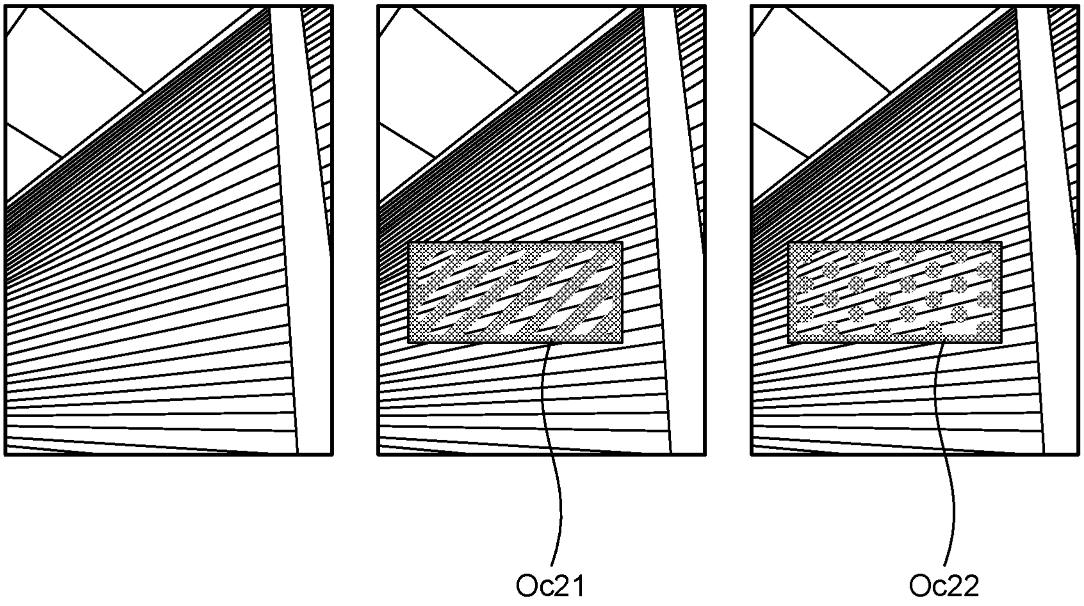
FIG. 20 is a diagram for explaining pattern determination processing by the pattern determination unit according to the present embodiment.

Next, another example of the hatching pattern selection by the pattern determination unit 233 will be described with reference to FIGS. 18 to 20. FIGS. 18 to 20 are diagrams for explaining pattern determination processing by the pattern determination unit 233 according to the present embodiment.

Screens illustrated in FIGS. 18 to 20 illustrate a case where, for example, a blind is included in the background. FIG. 18 illustrates the case of the background in which the blind is viewed from the left side, FIG. 19 illustrates the case of the background in which the blind is viewed from the front, and FIG. 20 illustrates the case of the background in which the blind is viewed from the right side. For example, when the user wearing the AR glasses as the display device 20 moves from the left side to the right side of the blind while viewing the blind, the background viewed by the user through the AR glasses varies in the order of FIG. 18, FIG. 19, and FIG. 20. In addition, in FIGS. 18 to 20, the left diagrams are each a screen constituted by only the background, the middle diagrams are each a screen in which a corrected object Oc21 corrected with the oblique line pattern is displayed on the background, and the right diagrams are each a screen in which a corrected object Oc22 corrected with the dot pattern is displayed on the background.

As illustrated in the middle diagrams of FIGS. 18 to 20, when the display device 20 displays the object Oc21 corrected with the right-upward oblique line pattern on the blind, the corrected image can be visually recognized without any problem when the corrected object Oc21 is superimposed on the background in which the blind is viewed from the front and the background in which the blind is viewed from the left side. However, when the corrected object Oc21 is superimposed on the background in which the blind is viewed from the right side, the texture pattern of the blind and the pattern of the corrected object Oc21 are similar to each other, whereby the visibility may be reduced.

On the other hand, as illustrated in the right diagrams of FIGS. 18 to 20, when the display device 20 displays the corrected object Oc22 in which the blind is corrected with the dot pattern, the corrected object Oc22 can be visually recognized regardless of the direction in which the blind is viewed.

As described above, even when the texture pattern of the transparent background area and the hatching pattern of the correction pattern are of the same type, such as a line pattern, the visibility of the corrected object Oc21 may not be reduced depending on the angle of the line. Therefore, the pattern determination unit 233 may select the same type of hatching pattern as the texture pattern of the transparent background area. In this case, the pattern determination unit 233 suppresses a reduction in the visibility of the corrected object Oc21 by changing the type of the "line pattern" such as the angle, thickness, interval, and the like of the line.

Alternatively, the pattern determination unit 233 may select a correction pattern of a hatching pattern different from the texture pattern of the transparent background area. Changing the type of the "line pattern" described above increases the processing load on the pattern determination unit 233. In particular, when the display device 20 is AR glasses, when the user wearing the AR glasses moves, the background also changes. When the type of the "line pattern" is changed in accordance with the change of the background, the processing load on the pattern determination unit 233 increases. On the other hand, when the pattern determination unit 233 selects a correction pattern of a hatching pattern different from the texture pattern of the transparent background area, the pattern determination unit 233 does not need to change the type of "line pattern", and thus an increase in processing load can be suppressed.

Examples of the texture pattern of the transparent background area that may reduce the visibility of the corrected object include curtains, crosswalks, floors covered with tiles or the like, patterns of ceilings and walls, stairs, and the like in addition to the above-described blinds and alerting stripes of railroad crossings. When these texture patterns including a line are included in the transparent background area, the pattern determination unit 233 selects a hatching pattern of a predetermined pattern such as dots or squares as the correction pattern.

In addition to the texture pattern including a line, texture patterns including dots or a specific pattern such as: patterns of a wall or a ceiling in a soundproof chamber or the like; furnishings such as clothing, a table cloth, or a curtain; and a paved road or gravel may be included in the transparent background area. In this case, the pattern determination unit 233 selects, for example, a hatching pattern of oblique lines as the correction pattern.

Note that the pattern determination unit 233 extracts, for example, a feature value from the transparent background area of the background image, and extracts a texture pattern of the transparent background area by pattern matching processing of the extracted feature value. The pattern determination unit 233 selects a correction pattern in accordance with the extracted texture pattern. Note that the correspondence relationship between the texture pattern and the correction pattern is stored in the storage unit of the display device 20 as, for example, a table.

Alternatively, the pattern determination unit 233 may select a correction pattern on the basis of, for example, machine learning. Specifically, the pattern determination unit 233 selects a correction pattern using a discriminator generated in advance by machine learning. For example, the pattern determination unit 233 selects a correction pattern on the basis of a result obtained by inputting the feature value included in the transparent background area to the discriminator. Note that the discriminator is assumed to be generated using machine learning in which, for example, the correction pattern having the highest visibility is set as the correct answer data when the feature value of the transparent background area is set as the input data.

As described above, the pattern determination unit 233 determines the correction pattern on the basis of the texture and brightness of the transparent background area, whereby a reduction in the visibility of the corrected image can be suppressed.

6. EXAMPLE OF CORRECTION PROCESSING

The correction processing by the area correction unit 234 will be described. The area correction unit 234 corrects the transparent area with the correction pattern determined by the pattern determination unit 233. However, to simplify the description, it is assumed that the pattern determination unit 233 selects the fill pattern.

<6.1. Case Where Replacement with Constant Value is Made>

Figure 21:
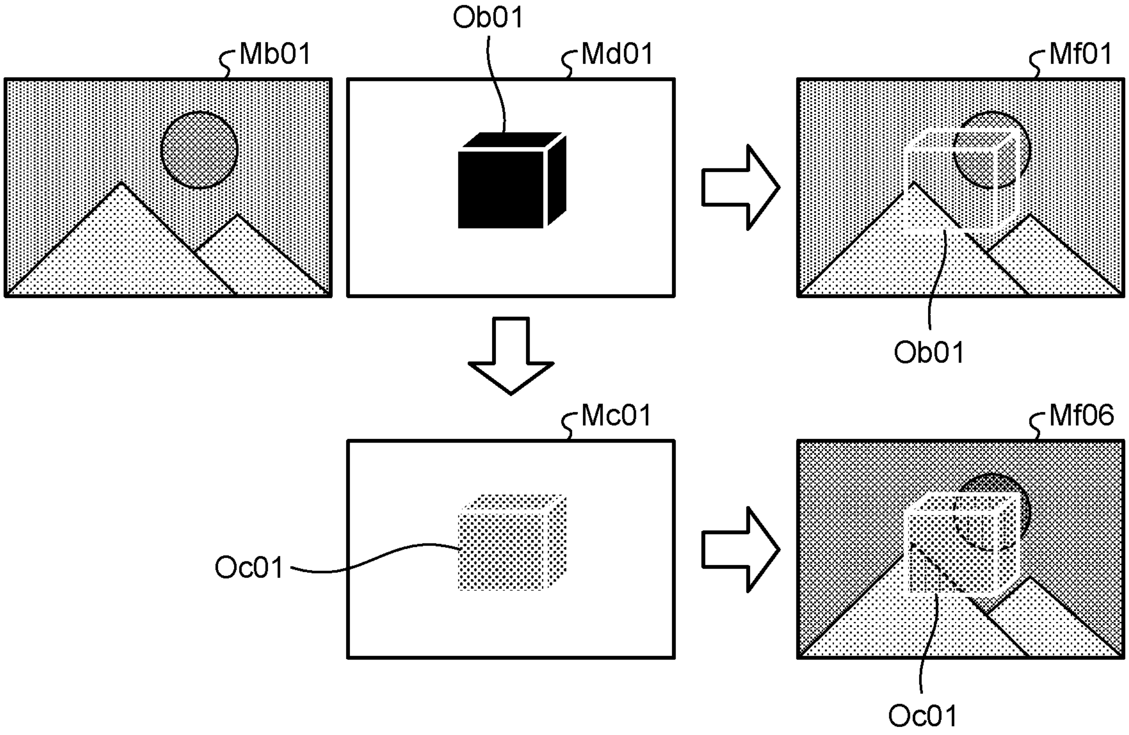
FIG. 21 is a diagram for explaining correction processing by an area correction unit according to the present embodiment.

FIG. 21 is a diagram for explaining correction processing by the area correction unit 234 according to the present embodiment. As illustrated in FIG. 21, the display device 20 displays the display image Md01 including the object Ob01 in a manner of being superimposed on the background Mb01. The object Ob01 includes a black area having pixel values (0, 0, 0). In this case, when the display device 20 superimposes the display image Md01 on the background Mb01 without correction, the black area is transparently displayed as illustrated in the screen Mf01.

Therefore, the area correction unit 234 corrects the object Ob01 by replacing the pixel value of the black area (corresponding to the transparent area) of the object Ob01 with a constant value, and generates a corrected image Mc01 including a corrected object Oc01. In the example of FIG. 21, the area correction unit 234 color-converts the pixel values (0, 0, 0) of the black area of the object Ob01 into pixel values (150, 150, 150) to generate the corrected image Mc01. The area correction unit 234 outputs, to the display unit 241, the corrected image Mc01 having been generated. In this way, as illustrated in a screen Mf06, the corrected object Oc01 can be presented so as to be visually recognized by the user.

<6.2. Case Where Constant Value is Added>

Note that, in the above-described example, the case where the area correction unit 234 replaces the pixel value of the transparent area with a constant value has been described, but the present disclosure is not limited thereto. For example, the area correction unit 234 may correct the transparent area by adding a constant value to the pixel value of the transparent area.

Figure 22:
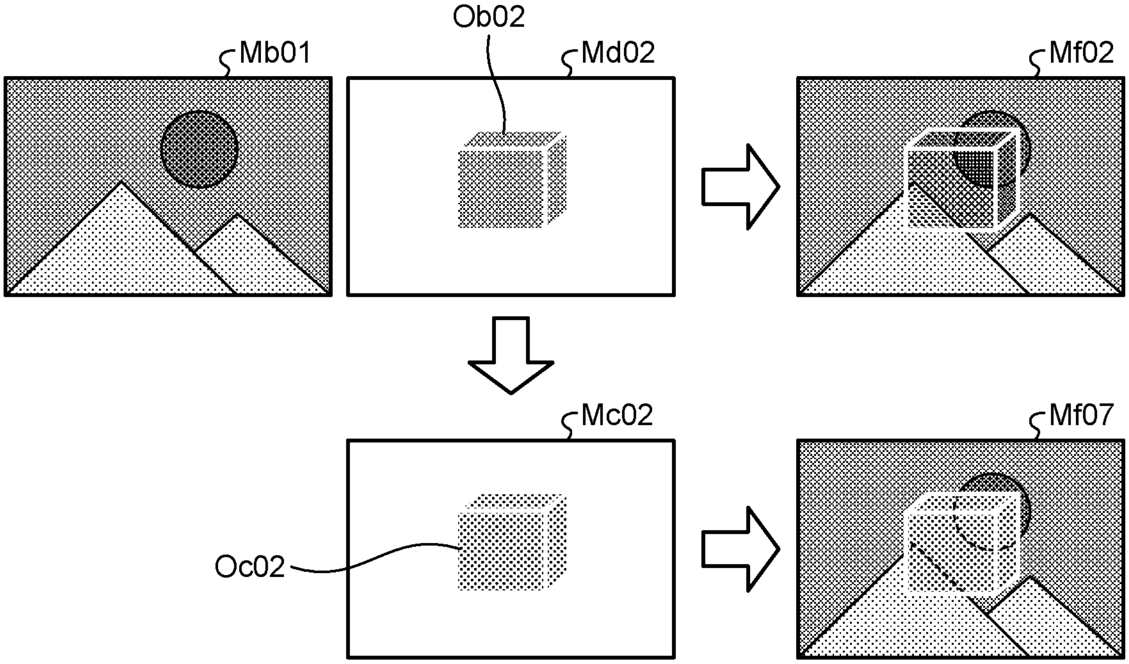
FIG. 22 is a diagram for explaining correction processing by the area correction unit according to the present embodiment.

FIG. 22 is a diagram for explaining correction processing by the area correction unit 234 according to the present embodiment. As illustrated in FIG. 22, the display device 20 displays the display image Md02 including the object Ob021 in a manner of being superimposed on the background Mb01. The object Ob02 includes a transparent area having pixel values (75, 0, 0). The transparent area is detected by the area detection unit 232.

In this case, when the display device 20 superimposes the display image Md02 on the background Mb01 without correction, the transparent area is transparently displayed as illustrated in the screen Mf02, and thus the visibility of the object Ob02 is reduced.

In view of this, the area correction unit 234 corrects the object Ob02 by adding a constant value to the pixel value of the transparent area of the object Ob02, and generates a corrected object Oc02. In the example of FIG. 22, the area correction unit 234 adds a constant value "75" to each of the pixel values (75, 0, 0) of the black area of the object Ob01 and color-converts such pixel values to the pixel values (150, 75, 75) to generate a corrected image Mc02. The area correction unit 234 outputs, to the display unit 241, the corrected image Mc02 having been generated. In this way, as illustrated in a screen Mf07, the corrected object Oc02 can be presented so as to be visually recognized more reliably by the user.

By adding a constant value to each of the pixel values of the transparent area of the object Ob41 as described above, the area correction unit 234 can make correction while maintaining the hue of an original object Ob41.

Note that the constant value described with reference to FIGS. 21 and 22 may be a value defined in advance, for example, a value determined in accordance with the luminance of the background. As described above, the visibility of the transparent area varies depending on the brightness (luminance) of the background. As such, the area correction unit 234 may determine a constant value in accordance with the brightness of the background, and correct the transparent area using the determined constant value. The area correction unit 234 determines the constant value according to the brightness of the background by referring to, for example, a table in which the illuminance value and the constant value are associated with each other. Note that the table is assumed to be predetermined by, for example, experiment, simulation, or the like, and be stored in the storage unit of the display device 20.

<6.3. Case Where Correction is Made in Accordance with Background>

In the correction processing described above, the case where the area correction unit 234 corrects the pixel value of the transparent area with a constant value has been described, but the present disclosure is not limited thereto. For example, the area correction unit 234 may correct the pixel value with a correction value different for each pixel of the transparent area.

Figure 23:
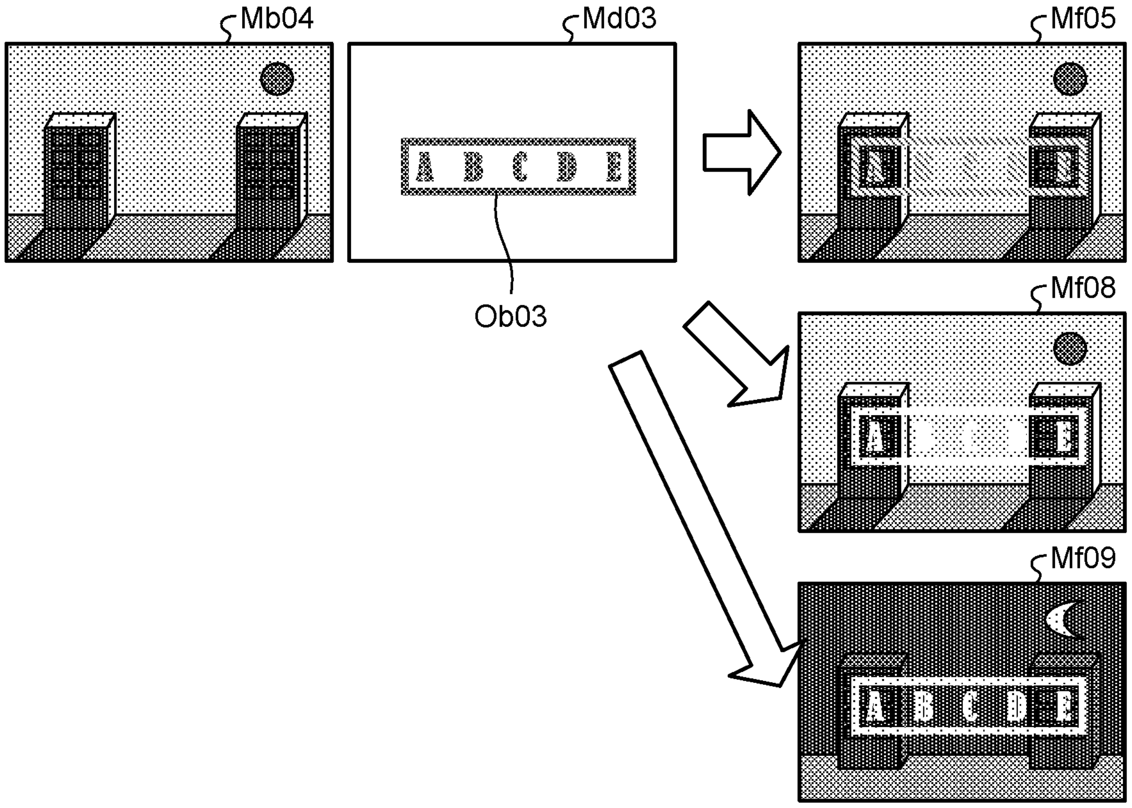
FIG. 23 is a diagram for explaining correction processing by the area correction unit according to the present embodiment.

FIG. 23 is a diagram for explaining correction processing by the area correction unit 234 according to the present embodiment. As described above, when there is an object such as a building in the real space, the brightness of the background Mb04 may vary depending on the place. In this case, when the display image Md03 including the object Ob03 is displayed as it is on the display unit 241, the object Ob03 in a portion where the background is bright is difficult to be visually recognized on the display unit 241, as illustrated in the screen Mf05. On the other hand, the object Ob03 in a portion where the background is dark is visually recognized more easily than that in a portion where the background is bright.

In a case where the visibility of the transparent area varies depending on the brightness of the background in this manner, when the pixel value of the transparent area is corrected with a constant value as described above, the visibility of the corrected object in a portion where the background is bright may be reduced as compared with that in a portion where the background is dark, as illustrated in a screen Mf08 of FIG. 23.

In this case, the area correction unit 234 corrects the pixel value of the transparent area for each pixel with a correction value according to the brightness of the background. For example, the area correction unit 234 determines a correction value for each pixel of the captured image taken by the photographing unit 210. For example, the area correction unit 234 increases the correction value as the value of the pixel value of the imaging pixel increases. For example, the area correction unit 234 determines the correction value according to the pixel value of the imaging pixel on the basis of a table in which the pixel value of the imaging pixel and the correction value are associated with each other. Alternatively, the area correction unit 234 determines the correction value on the basis of a function expressing the relationship between the pixel value of the imaging pixel and the correction value. It is assumed that the table or the function is determined in advance by, for example, experiment, simulation, or the like, and is stored in the storage unit of the display device 20.

Figure 24:
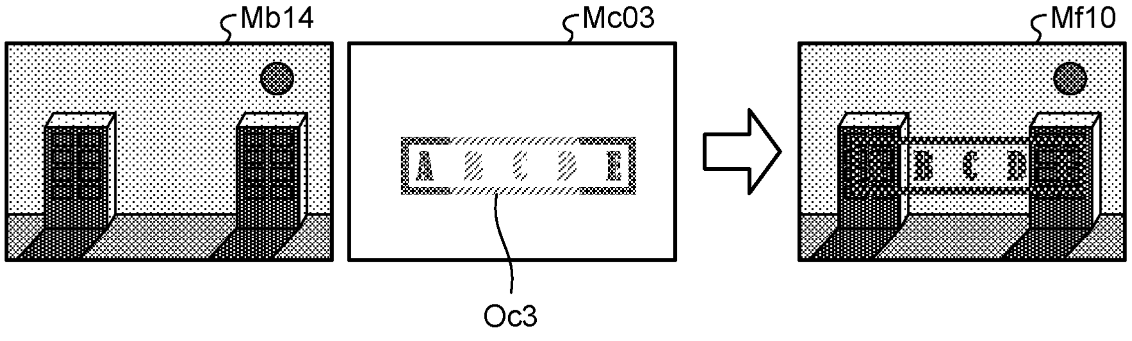
FIG. 24 is a diagram for explaining correction processing by the area correction unit according to the present embodiment.

The area correction unit 234 corrects the transparent area using the determined correction value. FIG. 24 is a diagram for explaining correction processing by the area correction unit 234 according to the present embodiment. For example, the area correction unit 234 illustrated in FIG. 24 determines a correction value on the basis of a captured image Mb14 obtained by capturing the real space, and corrects the display image Md03 illustrated in FIG. 23. In this case, the area correction unit 234 sets the correction value of the area of the object Ob03 displayed overlapping with the building of the captured image Mb14 to a value smaller than the correction value of the area of the object Ob03 displayed overlapping with those other than the building.

For example, the area correction unit 234 generates a corrected object Oc03 illustrated in FIG. 24 by adding the correction value according to each area to the pixel value of the object Ob03. As illustrated in FIG. 24, in the corrected object Oc03, the areas at both ends displayed overlapping with the building are corrected to be darker than the center area not overlapping therewith. When a corrected display image Mc03 including the corrected object Oc03 is displayed on the display unit 241, a reduction in the visibility of the corrected object Oc03 can be suppressed regardless of the brightness of the background, as illustrated in a screen Mf10 of FIG. 24.

Figure 25:
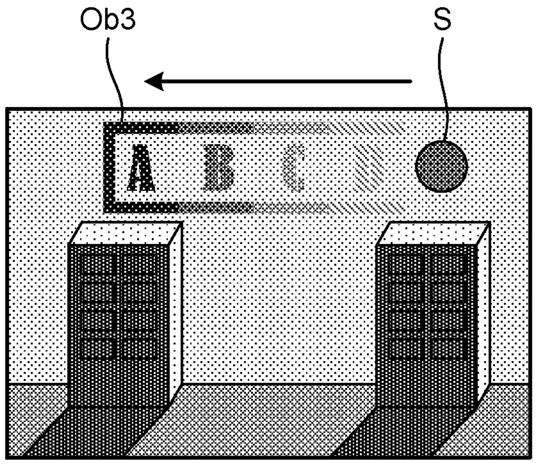
FIG. 25 is a diagram for explaining correction processing by the area correction unit according to the present embodiment.

Furthermore, as illustrated in FIG. 25, when the background includes an object that emits strong light such as sunlight or a light source (hereinafter, referred to as a light emitting object S), the luminance of the background increases for a smaller distance with respect to the light emitting object S. Therefore, the object Ob03 becomes more transparent and the visibility is further reduced for a smaller distance with respect to the light emitting object S.

As such, the area correction unit 234 determines the correction value such that the correction value increases for a smaller distance with respect to the light emitting object S. In this way, even when the light emitting object S is included in the background, the visibility of the transparent area can be improved. Note that FIG. 25 is a diagram for explaining correction processing by the area correction unit 234 according to the present embodiment.

Note that when the object Ob03 is displayed superimposed on the light emitting object S, the object Ob03 cannot be displayed such that the user can visually recognize the object Ob03, even by increasing the correction value. That is, even by performing correction in which the object Ob03 is converted into white by the area correction unit 234, when the object Ob03 is displayed superimposed on the light emitting object S, the user cannot visually recognize the object Ob03. Therefore, the object Ob03 is desirably displayed in an area other than the light emitting object S. Furthermore, also from the viewpoint of protecting the eyes of the user viewing the display unit 241, when the light emitting object S is included in the background, the object Ob03 is desirably displayed at a place away from the light emitting object S. In this case, the area correction unit 234 may perform correction to change the display position of the object Ob03.

In addition, the visibility of the corrected transparent area also depends on the brightness of the entire background. For example, as illustrated in the screen Mf05 of FIG. 23, in the case of a bright background of the daytime, the visibility of the corrected object varies depending on the brightness of the background. On the other hand, as illustrated in a screen Mf09, in the case of a dark background of the nighttime, the visibility of the corrected object is hardly affected by the brightness of the background. Therefore, the area correction unit 234 may determine the correction value in accordance with the brightness of the background.

Furthermore, in the correction processing described above, the area correction unit 234 determines the correction value for each pixel, but the present disclosure is not limited thereto. For example, the area correction unit 234 may divide the display image into predetermined areas and set the correction value for each of the divided areas. Note that the predetermined area may be an area obtained by dividing the display image at equal intervals, or may be an area obtained by dividing the display image in accordance with the feature value included in the display image. In this case, the area correction unit 234 may, for example, detect an edge from the display image as the feature value and set, as the predetermined area, the threshold value of the predetermined area by setting the area divided by the detected edge.

7. PROCEDURE OF IMAGE PROCESSING

Figure 26:
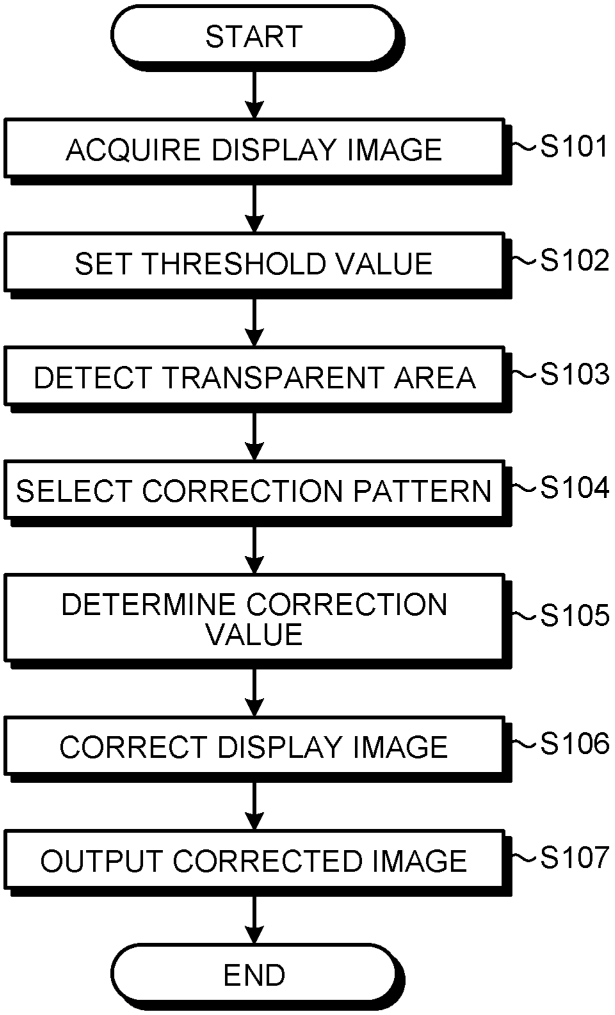
FIG. 26 is a flowchart illustrating a flow of image processing according to the present embodiment.

Next, a procedure of image processing according to the present embodiment will be described with reference to FIG. 26. FIG. 26 is a flowchart illustrating a flow of image processing according to the present embodiment. The image processing is executed, for example, when a display image is written in the memory 260. Furthermore, a display image is transmitted from the information processing apparatus 10 at a predetermined cycle, such as a moving image, the display device 20 executes image processing according to the present embodiment at a predetermined cycle.

First, the display device 20 refers to the memory 260 and acquires a display image to be displayed on the display unit 241 (Step S101). The display device 20 executes threshold value setting processing and sets a threshold value (Step S102). The display device 20 performs threshold value determination of the display image using the set threshold value, and detects the transparent area (Step S103).

Subsequently, the display device 20 executes pattern selection processing and selects a correction pattern (Step S104). In addition, the display device 20 determines a correction value of the transparent area (Step S105), and generates a corrected image by correcting the transparent area of the display image (Step S106).

The display device 20 outputs the corrected image instead of the display image to the display unit 241 (Step S107), and the processing ends.

Note that, when the display device 20 has not detected the transparent area in Step S103, the display image is output as it is to the display unit 241, and the processing ends.

As described above, the display device 20 according to the present embodiment (an example of the information processing apparatus) includes the control unit 230. When the display image is displayed on the transmissive display unit 241 in a manner of being superimposed on the real space (an example of a transmissive display), the control unit 230 detects, from the display image, the transparent area through which the real space is seen. The control unit 230 corrects pixel values of at least some pixels in the transparent area of the display image.

In this way, the display device 20 can more easily improve the visibility of the display image, particularly, that of the transparent area.

8. MODIFIED EXAMPLES

Note that, in the above-described embodiments, the display device 20 corrects the transparent area of the display image, but the present disclosure is not limited thereto. For example, the information processing apparatus 10 may correct the transparent area of the display image. Alternatively, an external device (not illustrated) may correct the transparent area of the display image. The external device may be, for example, a device that provides a display image to the information processing apparatus 10.

Alternatively, part of the image processing performed by the display device 20 may be executed by the information processing apparatus 10 or an external device. For example, the information processing apparatus 10 may recognize a captured image (extraction of a feature value or the like), set a threshold value, or select a correction pattern. By executing the image processing in a distributed manner in each device of the information processing system in this manner, the processing load of each device can be reduced, and the processing speed can be improved.

Furthermore, in the above-described embodiments, the display device 20 determines a threshold value and a correction value to correct the transparent area, but the present disclosure is not limited thereto. For example, the threshold value and the correction value determined by the display device 20 may be changed by the user. In this case, for example, the display device 20 may receive an instruction from the user via an input unit (not illustrated) such as a button included in the display device 20. Alternatively, the user may change the threshold value or the correction value via the information processing apparatus 10.

Furthermore, in the above-described embodiments, the display device 20 corrects the transparent area, but the present disclosure is not limited thereto. For example, the display device 20 may correct the pixel values of the entire display image such that the luminance of the entire display image increases. Alternatively, the display device 20 may increase the luminance of the display unit 241.

For example, when the luminance of the background is high and bright, such as a case where the display device 20 is used outdoors, the display image itself may become difficult to be visually recognized, or the visibility of the transparent area may become difficult to improve even by correcting the transparent area. In such a case, the visibility of the display image including the transparent area can be improved by increasing the luminance other than the transparent area, such as the luminance of the entire display image and the luminance of the display unit 241. Note that, in this case, even when the display image does not include the transparent area, the luminance other than the transparent area, such as the luminance of the display image and the luminance of the display unit 241, may be increased.

Furthermore, in the above-described embodiments, the display device 20 performs the threshold value determination for each of the pixel values (R, G, B) of the display image that is a color image, but the present disclosure is not limited thereto. For example, the display device 20 may convert a color image into a grayscale image and perform threshold value determination on the grayscale image. As described above, the display device 20 may perform threshold value determination on the luminance value of the pixel of the display image.

9. HARDWARE CONFIGURATION

Figure 27:
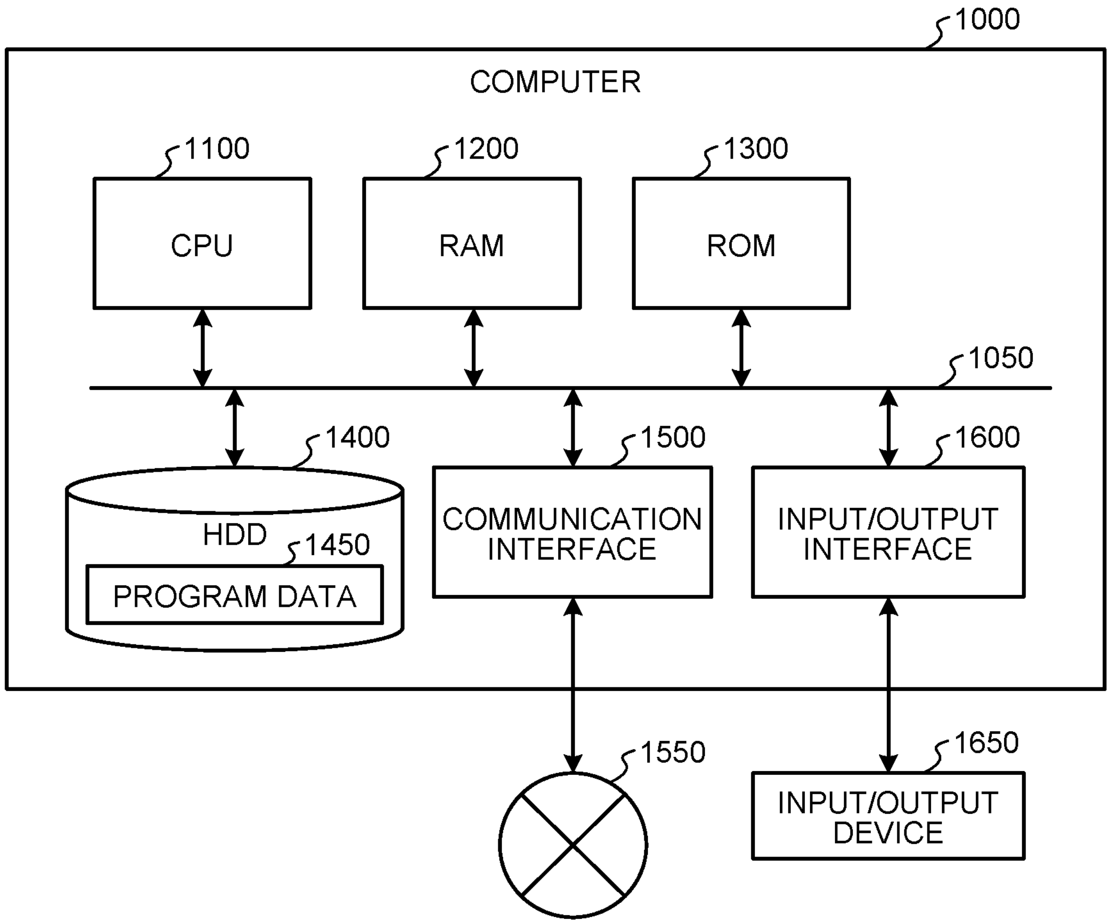
FIG. 27 is a hardware configuration diagram illustrating an example of a computer that implements functions of an information processing apparatus.

The information appliance such as the information processing apparatus 10 and the display device 20 according to the embodiments described above is implemented by a computer 1000 having a configuration as illustrated in FIG. 27, for example. Hereinafter, the information processing apparatus 10 according to the present embodiment will be described as an example. FIG. 27 is a hardware configuration diagram illustrating an example of the computer 1000 that implements functions of the information processing apparatus 10. The computer 1000 includes a CPU 1100, a RAM 1200, a read only memory (ROM) 1300, a hard disk drive (HDD) 1400, a communication interface 1500, and an input/output interface 1600. Each unit of the computer 1000 is coupled through a bus 1050.

The CPU 1100 operates on the basis of a program stored in the ROM 1300 or the HDD 1400, and controls each unit. For example, the CPU 1100 develops a program stored in the ROM 1300 or the HDD 1400 to the RAM 1200, and executes processing corresponding to various programs.

The ROM 1300 stores a boot program such as a basic input output system (BIOS) executed by the CPU 1100 when the computer 1000 is activated, and stores a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for coupling an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/ output interface 1600 may function as a media interface that reads a program or the like recorded in a predetermined recording medium (medium). Examples of the medium include an optical recording medium such as a digital versatile disc (DVD) or a phase change rewritable disk (PD); a magneto-optical recording medium such as a magneto-optical disk (MO); a tape medium; a magnetic recording medium; and a semiconductor memory.

For example, when the computer 1000 functions as the information processing apparatus 100 according to the first embodiment, the CPU 1100 of the computer 1000 implements the functions of a control unit 120 by executing the information processing program loaded on the RAM 1200. In addition, the HDD 1400 stores an information processing program according to the present disclosure and data in a storage unit 50. Note that the CPU 1100 reads the program data 1450 from the HDD 1400 and executes the program data. As another example, these programs may be acquired from another device via the external network 1550.

10. SUPPLEMENT

Although the preferred embodiments of the present disclosure have been described in detail with reference to the accompanying drawings, the technical scope of the present disclosure is not limited to the foregoing examples. It is obvious that a person who has common knowledge in the technical field of the present disclosure may, within the scope of the technical idea recited in the claims, conceive various alterations or modifications, and it should be understood that they also naturally belong to the technical scope of the present disclosure.

Furthermore, the effects described herein are merely illustrative or exemplary, and are not limitative. That is, the technology according to the present disclosure may, with or in lieu of the foregoing effects, exhibit other effects obvious to those skilled in the art from the description herein.

Note that the following configurations also belong to the technical scope of the present disclosure.

(1)

An information processing apparatus comprising:

a control unit configured to:

detect, when a display image is displayed on a transmissive display through which real space is visually recognizable, a transparent area through which the real space is seen, from the display image; and correct a pixel value of at least a part of an area in the transparent area of the display image.

(2)

The information processing apparatus according to claim 1, wherein the control unit is configured to detect a black area of the display image as the transparent area.

(3)

The information processing apparatus according to (1) or (2), wherein the control unit is configured to detect, as the transparent area, an area in which the pixel value of the display image is less than a threshold value.

(4)

The information processing apparatus according to (3), wherein the threshold value is a value defined in advance.

(5)

The information processing apparatus according to (3), wherein the control unit is configured to determine the threshold value in accordance with illuminance of the real space.

(6)

The information processing apparatus according to (3), wherein the control unit is configured to determine the threshold value on the basis of a captured image obtained by capturing the real space.

(7)

The information processing apparatus according to any one of (1) to (6), wherein the control unit is configured to correct the pixel value by adding a predetermined value to the pixel value of the area included in the transparent area of the display image.

(8)

The information processing apparatus according to (7), wherein the predetermined value is a value determined in advance.

(9)

The information processing apparatus according to (7), wherein the control unit is configured to determine the predetermined value in accordance with illuminance of the real space.

(10)

The information processing apparatus according to (7), wherein the control unit is configured to determine the predetermined value on the basis of a captured image of the real space.

(11)

The information processing apparatus according to any one of (1) to (10), wherein the control unit is configured to correct the pixel value such that the transparent area of the display image is displayed in a predetermined pattern.

(12)

The information processing apparatus according to (11), wherein the control unit is configured to select the predetermined pattern in accordance with a texture pattern in the transparent area of a captured image obtained by imaging the real space.

(13)

An information processing method comprising:

detecting, when a display image is displayed on a transmissive display through which real space is visually recognizable, a transparent area through which the real space is seen, from the display image; and correcting a pixel value of at least a part of an area in the transparent area of the display image.

(14)

A program that causes a computer to execute:

detecting, when a display image is displayed on a transmissive display through which real space is visually recognizable, a transparent area through which the real space is seen, from the display image; and correcting a pixel value of at least a part of an area in the transparent area of the display image.

REFERENCE SIGNS LIST

10 INFORMATION PROCESSING APPARATUS
20 DISPLAY DEVICE
130, 230 CONTROL UNIT

140, 270 STORAGE UNIT
150, 250 COMMUNICATION UNIT
160, 260 MEMORY
210 PHOTOGRAPHING UNIT
220 SENSOR UNIT
240 OUTPUT UNIT

The invention claimed is:

1. An information processing apparatus comprising:

a control unit configured to:

detect, when a display image is displayed on a transmissive display through which real space is visually recognizable, a transparent area through which the real space is seen, from the display image; and correct a pixel value of at least a part of an area in the transparent area of the display image by adding a predetermined value to the pixel value of the area included in the transparent area of the display image, wherein the control unit is implemented via at least one processor.

2. The information processing apparatus according to claim 1, wherein the control unit is further configured to detect a black area of the display image as the transparent area.

3. The information processing apparatus according to claim 1, wherein the control unit is further configured to detect, as the transparent area, an area in which the pixel value of the display image is less than a threshold value.

4. The information processing apparatus according to claim 3, wherein the threshold value is a value defined in advance.

5. The information processing apparatus according to claim 3, wherein the control unit is further configured to determine the threshold value in accordance with illuminance of the real space.

6. The information processing apparatus according to claim 3, wherein the control unit is further configured to determine the threshold value on a basis of a captured image obtained by capturing the real space.

7. The information processing apparatus according to claim 1, wherein the predetermined value is a value determined in advance.

8. The information processing apparatus according to claim 1, wherein the control unit is further configured to determine the predetermined value in accordance with illuminance of the real space.

9. The information processing apparatus according to claim 1, wherein the control unit is further configured to determine the predetermined value on a basis of a captured image of the real space.

10. The information processing apparatus according to claim 1, wherein the control unit is further configured to correct the pixel value such that the transparent area of the display image is displayed in a predetermined pattern.

11. The information processing apparatus according to claim 10, wherein the control unit is further configured to select the predetermined pattern in accordance with a texture pattern in the transparent area of a captured image obtained by imaging the real space.

12. An information processing method comprising:

detecting, when a display image is displayed on a transmissive display through which real space is visually recognizable, a transparent area through which the real space is seen, from the display image; and correcting a pixel value of at least a part of an area in the transparent area of the display image by adding a predetermined value to the pixel value of the area included in the transparent area of the display image.

13. A non-transitory computer-readable medium having embodied thereon a program, which when executed by a computer causes the computer to execute an information processing method, the method comprising:

detecting, when a display image is displayed on a transmissive display through which real space is visually recognizable, a transparent area through which the real space is seen, from the display image; and correcting a pixel value of at least a part of an area in the transparent area of the display image by adding a predetermined value to the pixel value of the area included in the transparent area of the display image.

* * * * *